(12) United States Patent
Azar et al.

(10) Patent No.: US 9,213,780 B2
(45) Date of Patent: Dec. 15, 2015

(54) CACHE AND INDEX REFRESHING STRATEGIES FOR VARIABLY DYNAMIC ITEMS AND ACCESSES

(75) Inventors: Joseph Yossi Azar, Redmond, WA (US); Eric Horvitz, Kirkland, WA (US); Eyal Lubetzky, Bellevue, WA (US); Dafna Shahaf, Pittsburgh, PA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 1034 days.

(21) Appl. No.: 12/492,916

(22) Filed: Jun. 26, 2009

(65) Prior Publication Data

US 2010/0332513 A1  Dec. 30, 2010

(51) Int. Cl.
*G06F 7/00* (2006.01)
*G06F 17/30* (2006.01)

(52) U.S. Cl.
CPC .... *G06F 17/30902* (2013.01); *G06F 17/30469* (2013.01)

(58) Field of Classification Search
CPC ................................................ G06F 17/30469
USPC ........................................................ 707/727
See application file for complete search history.

(56) References Cited

U.S. PATENT DOCUMENTS

| | | | |
|---|---|---|---|
| 5,706,435 A * | 1/1998 | Barbara et al. ................ | 711/141 |
| 7,308,643 B1 | 12/2007 | Zhu et al. | |
| 7,310,632 B2 | 12/2007 | Meek et al. | |
| 7,475,069 B2 | 1/2009 | Blackman et al. | |
| 2002/0147895 A1 * | 10/2002 | Glance et al. ................. | 711/158 |
| 2005/0091180 A1 * | 4/2005 | Peleg et al. ....................... | 707/1 |
| 2008/0071778 A1 * | 3/2008 | Perrone ............................. | 707/5 |
| 2008/0147649 A1 | 6/2008 | Kim et al. | |
| 2008/0306908 A1 | 12/2008 | Agrawal et al. | |
| 2008/0313168 A1 | 12/2008 | Liu et al. | |
| 2008/0319975 A1 | 12/2008 | Morris et al. | |
| 2009/0006388 A1 | 1/2009 | Ives et al. | |
| 2010/0174861 A1 * | 7/2010 | Katz et al. ..................... | 711/113 |

OTHER PUBLICATIONS

Brewington et al., "Keeping Up with the Changing Web", Microsoft. Downloaded on Apr. 24, 2009, pp. 52-58, http://ieeexplore.ieee.org/stamp/stamp.jsp?tp=&arnumber=841784&isnumber=18198.

(Continued)

*Primary Examiner* — Ajith Jacob
(74) *Attorney, Agent, or Firm* — Alin Corie; Kate Drakos; Micky Minhas

(57) ABSTRACT

Many computing scenarios involve an item cache or index, comprising items corresponding to source items that may change without notice, rendering the item in the item cache or index stale. It may not be possible to guarantee the freshness of the items, but it may be desirable to reduce staleness in an efficient manner. Therefore, the refreshing of items may be prioritized by first predicting the query frequency of respective item representing the rate at which an item is retrieved from the item cache (e.g., by monitoring queries for the item), predicting an update frequency representing the rate at which the source item is updated by the source item host (e.g., by classifying the source item type), and computing a refresh utility representing the improvement in cache freshness achieved by refreshing the item. Respective items may then be prioritized for refreshing according to the computed refresh utilities.

20 Claims, 11 Drawing Sheets

(56) References Cited

OTHER PUBLICATIONS

Chakrabarti et al., "Focused Crawling: A New Approach to Topic-Specific Resource Discovery", Submitted to the Eighth World Wide Web Conference, Toronto, Canada, 1999, http://mainline.brynmawr.edu/Courses/cs380/fall2006/prelim.pdf.

Safronov et al., "Page Rank Prefetching for Optimzing Accesses to Web Page Clusters", http://citeseerx.ist.psu.edu/viewdoc/download?doi=10.1.1.73.9983&rep=rep1&type=pdf.

Srinivasa, Srinath, "Issues in Web Crawling", http://osl.iiitb.ac.in/~sri/schedules/webir/crawling.pdf.

Cho et al., "Effective Page Refresh Policies for Web Crawlers", ACM Journal Name, vol. V, No. N, Month 20YY, pp. 1-36, http://oak.cs.ucla.edu/~cho/papers/cho-tods03.pdf.

Cho et al., "Estimating Frequency of Change", ACM Journal Name, vol. V, No. N, Month 20YY, pp. 1-32, http://oak.cs.ucla.edu/~cho/papers/cho-freq.pdf.

* cited by examiner

132

ComputeRefreshProbabilities($\vec{u}, \vec{c}$)

sort $\vec{u}, \vec{c}$ according to $\frac{u_i}{c_i}$ in ascending order for $i = 1$ to $n$ $\vec{u'} = \vec{u_{i:n}}$ $\vec{c'} = \vec{c_{i:n}}$ $\lambda = $ GetLambda($\vec{u'}, \vec{c'}$)

$\vec{p'} = $ GetP($\lambda, \vec{u'}, \vec{c'}$)

if min($\vec{p'}$) $\geq 0$ then $val = $ GetValue($\vec{u'}, \vec{c'}, \vec{p'}$)

select solution with maximum $val$ ($i_{max}, \vec{p'}_{max}, val_{max}$)

return $\vec{p'}_{max}$

End

134

GetLambda($\vec{u}, \vec{c}$)

$$\lambda = \left(\frac{\sum \frac{\sqrt{u_i \cdot c_i}}{1 - c_i}}{1 + \sum \frac{c_i}{1 - c_i}}\right)^2$$

return $\lambda$

End

136

GetP($\lambda, \vec{u}, \vec{c}$)

for $i = 1$ to $n$ $$p_i = \frac{\sqrt{\frac{u_i c_i}{\lambda}} - c_i}{1 - c_i}$$

return $\vec{p}$

End

138

GetValue($\vec{p}, \vec{u}, \vec{c}$)

$$val = \sum_i u_i \cdot \frac{p_i}{1 - (1 - p_i) \cdot (1 - c_i)}$$

return $val$

End

ComputeRefreshProbabilities_RemoveNegatives($\vec{u}, \vec{c}$)

$\lambda = $ GetLambda($\vec{u}, \vec{c}$)

$\vec{p} = $ GetP($\lambda, \vec{u}, \vec{c}$)

while min($\vec{p}$) $< 0$ remove items with $p_i < 0$ $\lambda = $ GetLambda($\vec{u}, \vec{c}$)

$\vec{p} = $ GetP($\lambda, \vec{u}, \vec{c}$)

return $\vec{p}$

End

ComputeApproximatePolicy($\vec{u}, \vec{c}, N$)

$\varepsilon = \frac{1}{N}$ $\vec{p} = (0, ..., 0)$ for $i = 1$ to $n$ $d_i$ = GetDerivativeFlux($u_i, c_i, p_i, \varepsilon$)

for $j = 1$ to $N$ find $i$ with maximum $d_i$ $p_i = p_i + \varepsilon$ $d_i$ = GetDerivativeFlux($u_i, c_i, p_i, \varepsilon$)

return $\vec{p}$

End

154

GetDerivativeFlux($u_i, c_i, p_i, \varepsilon$)

$$d_i = \frac{u_i \cdot c_i}{((1-p_i) \cdot (1-c_i)-1)^2} + \frac{u_i \cdot c_i}{((1-(p_i+\varepsilon)) \cdot (1-c_i)-1)^2}$$

return $d_i$

End

FIG. 11

CACHE AND INDEX REFRESHING STRATEGIES FOR VARIABLY DYNAMIC ITEMS AND ACCESSES

BACKGROUND

Many computing scenarios may involve a cache configured to store an item cache comprising items corresponding to source items stored by one or more source item hosts. The cache might be configured, e.g., to store local versions of the source items; as a descriptor of the source items, such as metadata relating to respective source items; or as an index of the source items. In some of these scenarios, the source items may be variably dynamic, referring to the volatility of the presence and the content of items: some items may be static, other items may be updated infrequently, and other items may change frequently; and where some items are updated at a consistent frequency, while updates of other items are fluctuating or erratic. Respective source items may therefore change at the source item host, but with a variable frequency of changing. However, the cache may not be notified by the source item host when a source item changes, so some of the items in the cache may be stale, i.e., not necessarily reflecting the up-to-date version of the source item available at the source item host. The cache may endeavor to refresh respective items in the cache through a polling mechanism, e.g., requesting the corresponding source item from the source item host and refreshing the item in the cache with any changes since the previous refreshing of the item. However, the cache refreshing may involve considerable computing resources, such as a limited download capacity for receiving items from source item hosts that are accessible over a network. The challenge of refreshing caches also extends to the closely related challenge of maintaining a fresh index of a large-scale resource like the Worldwide Web, where a local index is used to support such services as search and retrieval.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Due to the scarcity of computing resources available for refreshing items in the cache, an allocation strategy may be employed to allocate refreshing resources for various items, such that items of higher priority may be refreshed before or more frequently than items of lower priority. This priority may be based, e.g., on at least two factors: a predicted query frequency of queries requesting the item, and a predicted update frequency of the source item by the source item host. The query frequency for an item and the update frequency of the source items may be predicted based on a real-time or an ongoing monitoring of queries and page changes. However, either quantity may be difficult to estimate for some future period. Such difficulties can arise because of context-sensitive variation in the queries and/or page changes. Another challenge is that new items, i.e., items that have not been monitored in the past, may be created and thus come into existence, and predicted queries and update rates may not be available. One technique for predicting the query frequencies and/or the update frequencies of particular items involves training and applying one or more probabilistic classifiers. Such classifiers can be developed for predicting queries and for content change. The probabilistic classifiers for each prediction can be developed to predict steady-state quantities and rates or to, more generally, consider and predict the dynamics of numbers of queries or item changes. Similarly, it is feasible to build classifiers of the update frequencies, including steady state and dynamics of the rate of change, of the source item (based on various factors, such as the nature of the content in the source item and the source item host) to identify a source item type, and then choosing an update frequency that is typical of source items of the identified source item type. Such probabilistic classifiers may be developed in many ways, including heuristically and through a machine learning technique, such as a neural network classifier or a Bayesian classifier.

If the query frequency for the items and the update frequency of the corresponding source items may be predicted, the items may be prioritized for refreshing, such that items of higher priority (items that are frequently requested in queries, and that correspond to source items that are frequently updated by the source item host) are refreshed more frequently than items of lower priority (items that are not requested by queries often, or that do not change often.) Items at the ends of the spectrum may be excluded from the refreshing mechanism (e.g., items that change so frequently that the item in the cache is almost never up-to-date may be excluded from the cache and simply retrieved from the source item host upon each query; conversely, source items that change very infrequently or that correspond to items that are very rarely queried may be rarely or not periodically refreshed.) The prioritization may be based on a utility model, where the resources available for refreshing items may be allocated in a manner that achieves a desirably high utility. This utility may be viewed, e.g., as the decrease in the odds that a query for an item from the cache may receive a stale version of the item. This computation may take into account the query frequency for the item (how many queries may be incorrectly fulfilled with a stale copy of the item from the item cache?) and the odds (in view of the predicted update rate and the date of the last refreshing) that the source item has been updated by the source item host since the corresponding item was last refreshed. The utility model may be devised based on allocating the refreshing resources to reduce these probabilities, and algorithms may rely on the utility model in choosing to allocate refreshing resources to different sets and types of items in the item cache.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 9 is a set of pseudocode blocks together illustrating an algorithm configured according to a technique for computing a set of predicted refresh probabilities for a set of items.

FIG. 10 is a set of pseudocode blocks together illustrating an algorithm configured according to another technique for computing a set of predicted refresh probabilities for a set of items.

FIG. 11 is a set of pseudocode blocks together illustrating an algorithm configured according to yet another technique for computing a set of predicted refresh probabilities for a set of items.

DETAILED DESCRIPTION

Figure 1:
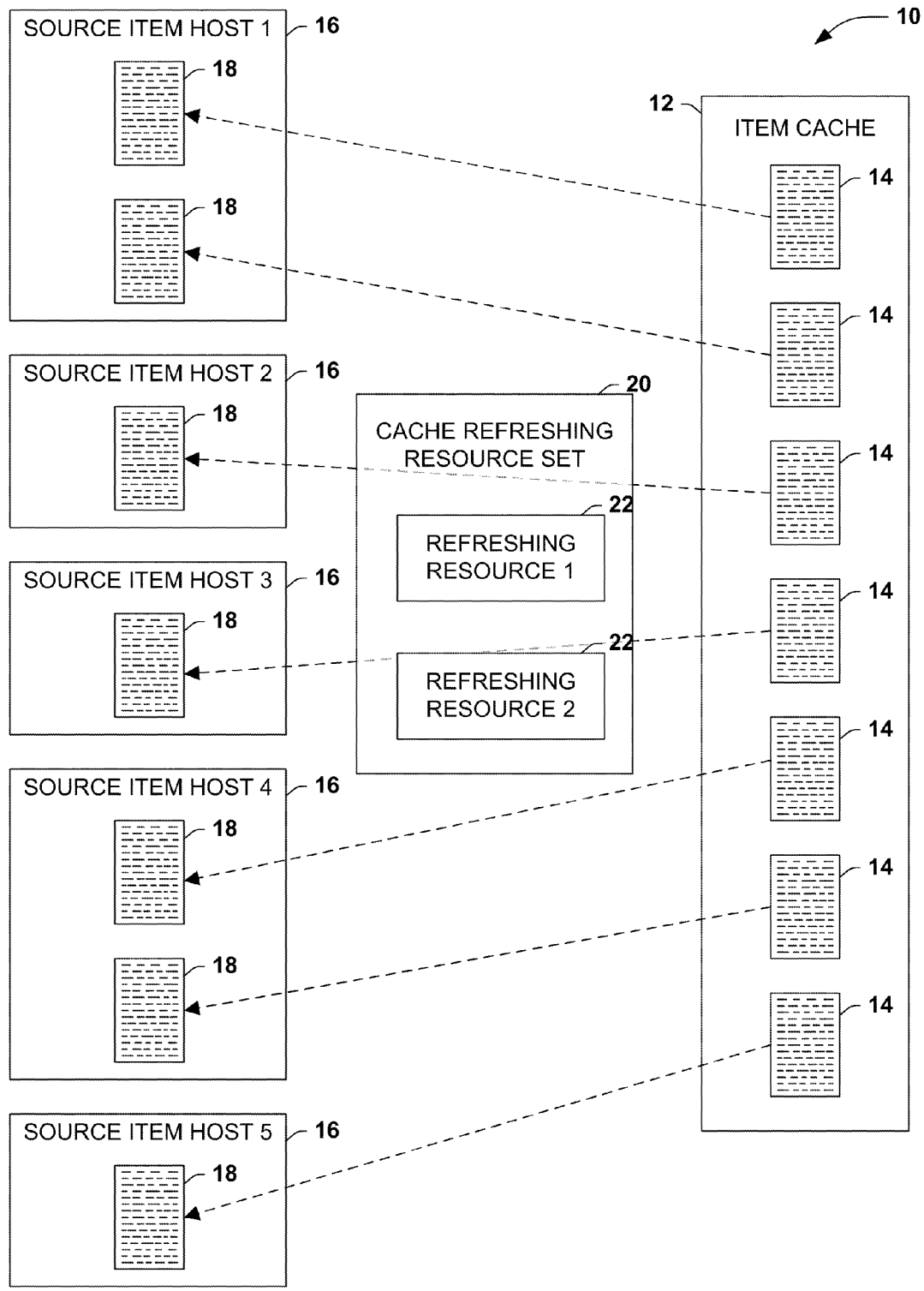
FIG. 1 is an illustration of a set of items in an item cache that is serviced by a set of cache refreshing resources.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve a caching of source items that may be stored at one or more source item hosts, where the source items may be updated by the source item hosts with varying frequencies. Some caches have a low tolerate any degree of "staleness," where the cached items may reflect out-of-date items available at the source item hosts; e.g., a memory cache providing rapid access to system memory or a storage device may depend on up-to-date items. However, for other types of caches, eliminating staleness may not be feasible, but reducing staleness may be desirable. These caches may endeavor to refresh items by polling the source item hosts, e.g., by periodically requesting an updated copy of the source item from the source item host and by propagating updates to the corresponding item in the item cache. As a first exemplary scenario, a web proxy may utilize these techniques in order to maintain the freshness of items stored in a proxy cache, which may be positioned between a user population (such as a local area network) and the internet to improve the efficient use of internet-facing bandwidth. For example, the user population may frequently request a particular set of web pages, and the proxy cache may reduce the redundant fetching of these web pages upon each request by automatically fetching the web page into the proxy cache and providing the cached web page to the users instead of the live page. While this technique may be helpful, the items in the proxy cache have to be maintained in order to avoid serving stale versions of the cached web pages to the users. As a second exemplary scenario, a web search engine may explore the pages or other items comprising a portion of the web (e.g., with a web crawler) and may store local representations of the discovered web pages in a local cache for use in providing search results for a search query. However, as the represented web pages change, the local representations may have to be refreshed in order to provide accurate web search results.

FIG. 1 presents an exemplary scenario 10 that generally illustrates these and other scenarios involving a set of items 14 stored in an item cache 12. The items 14 correspond to source items 18 retrieved from one or more source item hosts 16, and are stored in the item cache 12 in order to provide rapid access to a set of frequently requested queries. These queries may, e.g., be specific requests for the source items 18 hosted by the source item hosts 16, such as a URL identifying a particular web page or web resource, or may be a more general query that produces a result set pertaining to the source items 18, where the result set is stored as the item 14 in the item cache 12 and may be frequently updated based on changes to the source items 18 so queried. As the source items 18 offered by the source item hosts 16 change over time, the items 14 in the item cache 12 have to be refreshed in order to avoid producing stale results referencing old versions of the source items 18. Therefore, a cache refreshing resource set 20 may be utilized to refresh the items 14 in the item cache 12. For example, the cache refreshing resource set 20 might comprise a first refreshing resource and a second refreshing resource, each of which might comprise a process designed to refresh items 14 in the item cache 12. As one possible but inefficient example, the cache refreshing resources 22 might be configured to select an item 14 at random from the item cache 12, retrieve the corresponding source item 18 from the corresponding source item host 16, and compare the item 14 with the source item 18. If any differences are detected between the item 14 and the source item 18, the refreshing process may write the source item 18 over the stale version of the source item 18 stored in the item cache 12, thereby refreshing the item 14.

In these and other scenarios, stale results, while not necessarily fatal to the operation of the item cache 12, are to be avoided by allocating cache refreshing resources 22 in a manner that reduces the probability of serving an out-of-date item. For example, the cache refreshing resources 22 may be allocated to refresh the items 14 in the item cache 12 based on various relevant factors. A first relevant factor is the query frequency for the item 14 in the item cache 12 (e.g., the frequency with which users request a particular source item 14, such as a web page, which may be expediently served from the item cache 12, or the frequency with which a particular query is executed against a database, such as by a data-driven application.) A higher query frequency implies a higher incurred penalty from serving a stale version of the item 14, which therefore warrants a higher refresh frequency. A second relevant factor is the frequency with which the source item 18 is updated by the source item host 16; items 14 corresponding to source items 18 that are more frequently updated by the source item host 16 may be refreshed more frequently than items 14 corresponding to source items 18 that are less frequently updated by the source item host 16. Other factors may also be relevant to the manner of allocating the cache refreshing resources 22 applied to the item cache 12. For example, the refreshing of some items 14 may be more significant than the refreshing of other items 14; e.g., the penalty of serving an old version of a news report in the item cache may be much higher than the penalty of serving an old version of an academic article in the item cache 12, even if both items 14 change at a similar frequency.

If the query frequency of items 14 and the update frequency of corresponding source items 18 may be determined or estimated, then a refresh utility for the item 14 may be selected. A cache refreshing policy may be selected in pursuit of many priorities, such as allocating resources to refresh the most frequently requested items 14; maximizing the percentage of fresh items 14 in the item cache 12; or most efficiently allocating the cache refreshing resources 22, such that the requests are only issued for source items 18 that are most likely to have been updated since the last refresh of the corresponding item 14. Depending on the selected priorities and the comparative significance thereof, the strategy for refreshing the item cache 12 may be configured to allocate the cache refreshing resources 22 that most efficiently promote these priorities, i.e., in order to achieve the most useful allocation of the cache refreshing resources 22. Therefore, the refresh strategies utilized in these techniques may involve using the predicted query frequency and update frequency of respective items 14 in order to devise a refreshing policy that achieves a high refresh utility, according to the selected set of priorities and the comparative significance thereof.

Based on this perspective, techniques may be developed to select an allocation of cache refreshing resources 22 in order to maximize the refresh utility of the item cache 12 achieved thereby. As a first example, models may be devised and applied that relate the predicted query frequencies and update frequencies of respective items to a computation of the refresh utility attributed to any particular resource, i.e., to the increase in the refresh utility achieved by refreshing a first item 14 as compared with refreshing a second item 14. This computation may vary according to different sets of priorities; e.g., the penalty of serving an out-of-date item 12 may be differently factored into the computation, as well as the significance of efficiency (i.e., is a penalty incurred if a refresh is attempted of an item 14 that is not out of date?)

These models may output many types of recommended cache refreshing strategies, such as a ranking of items 14 to be refreshed; as a recommended refresh frequency for respective items 14, i.e., the frequency with which the cache refresh resources 22 may advantageously refresh a particular item 14 based on its predicted query frequency and the predicted update frequency of the corresponding source item 18; or as the resulting flux of the measured utility for a particular set of items 14 in the item cache 12. An alternative model might compute a refresh probability for respective items 14; e.g., a cache refresh resource 22 may choose an item 14 randomly from the item cache 12 to be refreshed, where the probabilities of selecting various items 14 may be weighed according to the refresh utility that may be achieved if this item 14 is selected for refreshing. For example, items 14 of descending priority in refreshing may have computed refresh probabilities (respectively) of 75%, 20%, and 5%; and a random allocation of the cache refresh resources 22 among these items 14 that is probabilistically weighted in this manner may achieve a high degree of refresh utility for the item cache 12. This stochastic approach may be more advantageous than a simple selection, e.g., selecting items 14 in a strict order according to the respective query frequencies 32 and the update frequencies 36, because a stochastic model permits items 14 allows for an occasional refreshing of items 14 with a consistently low refresh utility. It may also be advantageous to compute an aggregated prediction of the freshness quality of the items 14 of an item cache 12 in a particular state. This aggregated refresh utility metric may be used, e.g., to tweak the refresh strategies or in order to improve the measurement of utility, or to compare the relative effectiveness of two or more cache refresh strategies.

Figure 2:
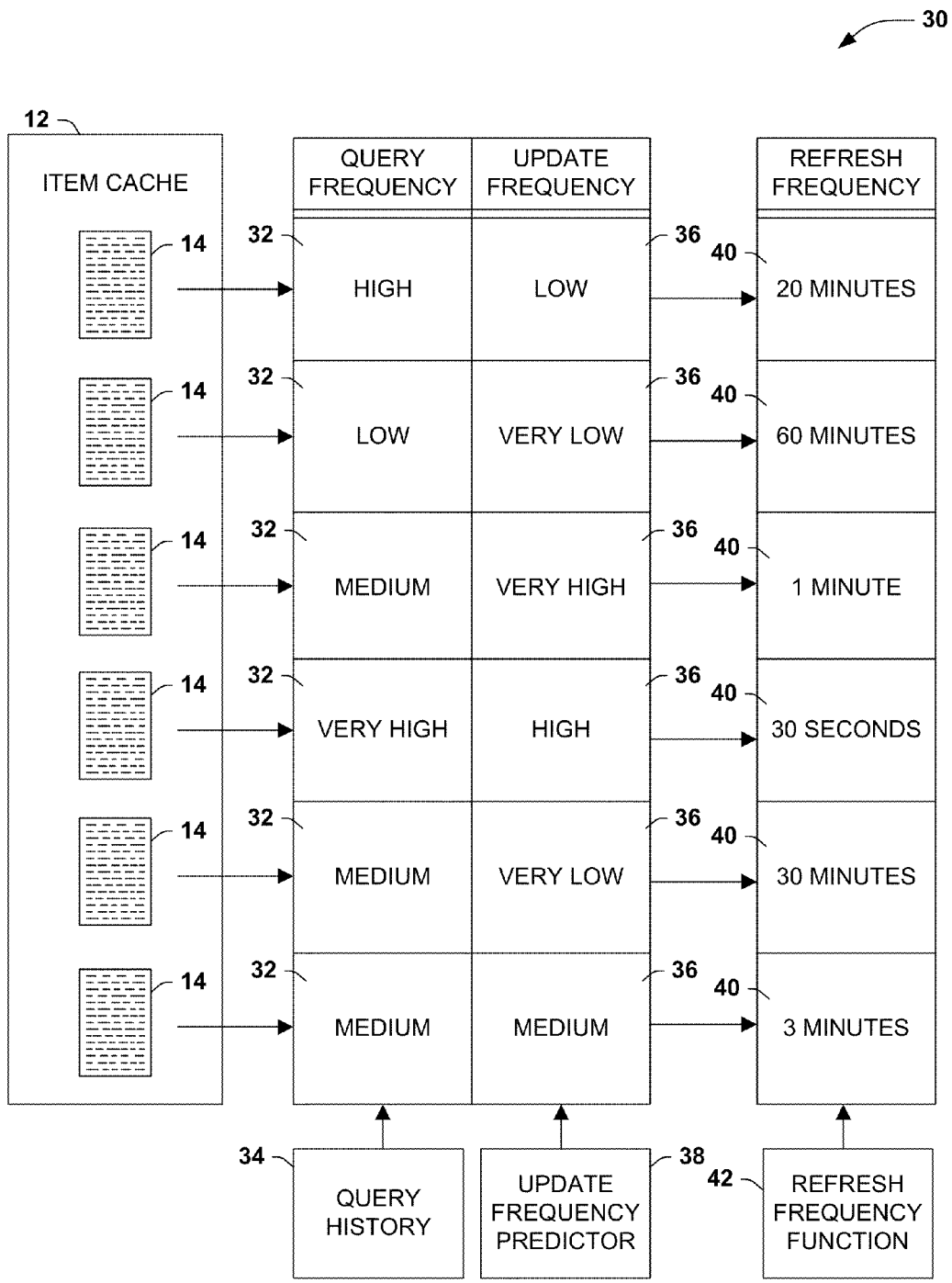
FIG. 2 is an illustration of a computation of refresh utilities for various items in an item cache according to predicted query frequencies and predicted update frequencies.

FIG. 2 illustrates an exemplary scenario 30 involving a computation of refresh frequencies 40 (based on a computation of a refresh utility) for various items 14 of the item cache 12 based on a query frequency 32 of queries requesting the respective items 14 and on an update frequency 36 of corresponding source items 18 by the source item host 16. The query frequency 32 of an item 14 may be predicted based on a query history 34 (e.g., an aggregate web browsing history indicating the web-accessible items that users have recently requested; a log of web search queries that have been executed against a web search engine; or a log of database queries that have been applied against a database.) The query history 34 may be analyzed to identify queries specifying respective items 14, and an update frequency 36 (indicated in this exemplary scenario 30 as a qualitative metric) may be predicted for the item 14. The update frequencies 36 may also be predicted, e.g., using an update frequency predictor 38 that predicts the update frequencies 36 of source items 18 corresponding to respective items 14 in the item cache 12. There may be many ways of predicting the update frequencies 36; as one workable but perhaps inefficient example, the update history of respective source item 18 may be monitored for a particular period (e.g., 24 hours) to compute an average or consistent update frequency of the source item 18. The update frequency 36 may then be attributed to the corresponding item 14 in the item cache 12 (again illustrated as a qualitative measurement.) Based on these metrics, a refresh frequency 40 may be computed for respective items 14, such as an interval wherein the items 14 are to be refreshed. The refresh frequency 40 may be computed, e.g., by a refresh frequency function 42, which may estimate a refresh frequency 40 for the item that might provide a comparatively high resulting refresh utility.

While a refresh frequency 40 may be computed (based on a computed refresh utility) in various ways for respective items 12, the availability of cache refreshing resources 22 may also be relevant. A comparatively ambitious selection of refresh frequencies may overwhelm an inadequate set of available cache refreshing resources 22, while an overly lax selection of refresh frequencies may leave some cache refreshing resources 22 idle while stale items 14 accumulate in the item cache 12. Therefore, instead of assigning refreshing frequencies to items 14 in the abstract, it may be advantageous to prioritize the refreshing of items 14 in the item cache 12. A prioritization of items 14 may enable an allocation of cache refreshing resources 22 first for the highest priority items 12, and then continuing through lower priority items 12 until the cache refreshing resources 22 are fully allocated.

Figure 3:
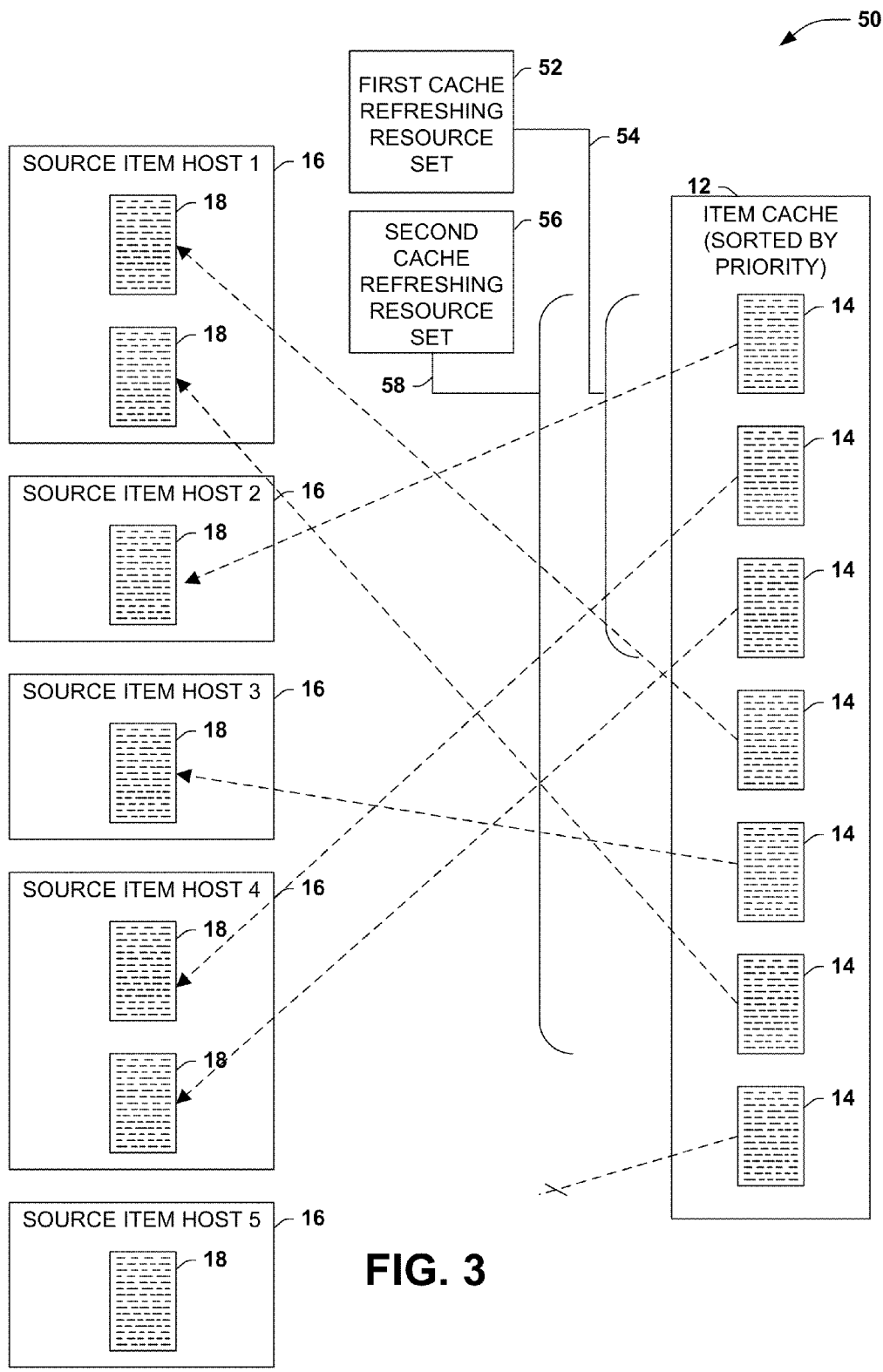
FIG. 3 is an illustration of an allocation of various cache refreshing resource sets to service prioritized items in an item cache.

FIG. 3 illustrates an exemplary scenario 50 illustrating the allocation of cache refreshing resources to items 14 in an item cache 12 according to this technique. The items 14 in the item cache 12 correspond to source items 18 provided by one or more source item hosts 16, but as the source items 18 change, the items 14 may become increasingly stale without periodic refreshing. Moreover, in this exemplary scenario 50, the items 14 in the item cache 12 are sorted by priority, with the highest priority items 14 (e.g., those that are very frequently requested by queries, and with corresponding source items 18 that frequently change) ordered at the top of the item cache 12, and with the lowest priority items 14 (e.g., those that are infrequently requested, and with corresponding source items 18 that are comparatively static) ordered at the bottom of the item cache 12. (It may be appreciated that the items 14 in the item cache 12 may not be logically rearranged; rather, a priority-based ordering may be established to identify the relative priority of any item 14 in the item cache 12 with respect to any other item 14 in the item cache.) As an example, the highest priority item 14 might have to be refreshed, e.g., once every minute, such as a stock ticker; the second highest priority item 14 might have to be refreshed once every five minutes, such as a news site; and the lower priority items 14 might have to be refreshed once every hour. Some items, such as the lowest priority item 14 in the item cache 12 may be of such low priority as to be excluded from the item refreshing; e.g., the source item 18 may be completely static, and therefore any refreshing of the item may comprise an unhelpful allocation of cache refreshing resources 22.

The prioritization of the items 14 in FIG. 3 may be utilized to allocate cache refreshing resources 22 in an efficient manner. For example, in FIG. 3, the item cache 12 might alternatively be serviced by a first cache refreshing resource set 52, comprising a smaller set of cache refreshing resources 22, or by a second cache refreshing resource set 56, comprising a comparatively larger set of cache refreshing resources. The first cache refreshing resource set 52 may be allocated to the refreshing of items 14 in the item cache 12 starting with the highest priority item 14 (shown at the top) and continuing downward. However, the first cache refreshing resource set 52 may only be sufficient to cover an allocation 54 over the first three items 14. The remaining items 12 might be handled in many ways; e.g., an additional low-frequency cache refreshing resource 22 might endeavor to refresh every item in the item cache 12 on a low-frequency basis (e.g., once an hour.) By contrast, the second cache refreshing resource set 56 might comprise enough resources for an allocation 58 covering all but the lowest priority item 14. It may be appreciated from an examination of FIG. 2 that sorting the items 14 in the item cache 12 according to priority may promote the efficient allocation of a cache refreshing resource thereover.

Figure 4:
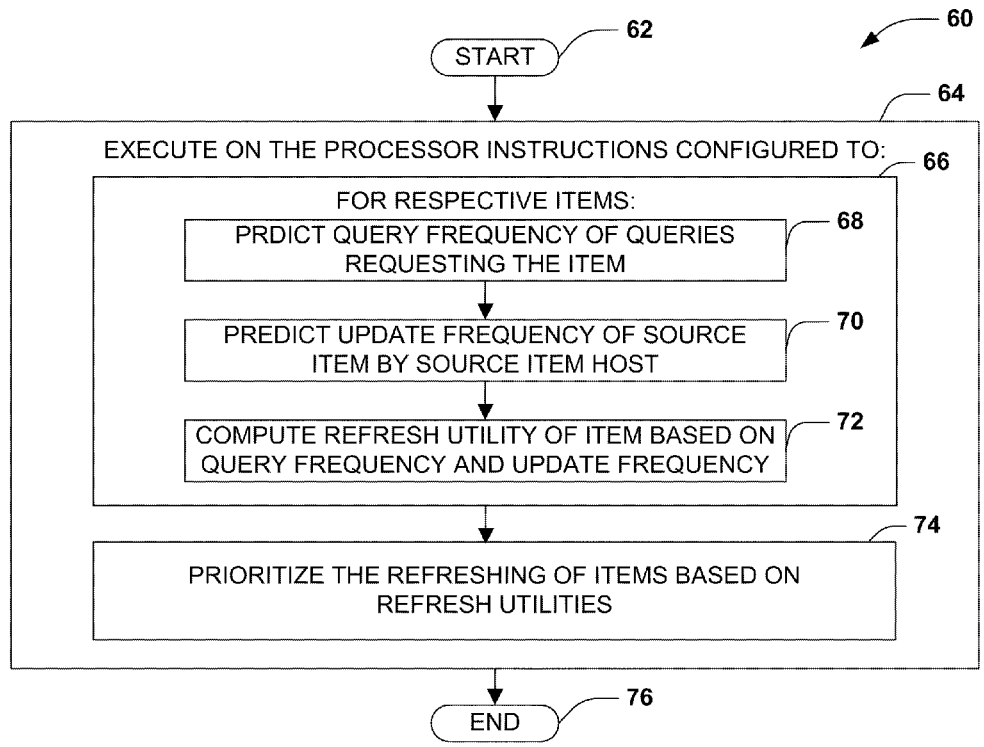
FIG. 4 is a flow chart illustrating an exemplary method of prioritizing a refreshing of items provided in response to queries and stored in an item cache.

FIG. 4 illustrates a first embodiment of the techniques discussed herein, presented as an exemplary method 60 of prioritizing a refreshing of items 14 provided in response to queries, where the items 14 are stored in an item cache 12. The exemplary method 60 may be performed, e.g., by a computer having a processor, and having access to source item hosts 16 storing source items 18 corresponding to the items 14 in the item cache 12. The exemplary method 60 begins at 62 and involves executing 64 instructions on the processor that are configured to utilize the techniques presented herein. In particular, the instructions may be configured, for respective items 66, to predict 68 a query frequency 32 of queries requesting the item 14; to predict 70 an update frequency 36 of the corresponding source item 16 by the source item host 18; and to compute 72 a refresh utility of the item 14 based on the query frequency 32 and the update frequency 36. After computing 72 the refresh utilities 72 of the respective items 14, the instructions of the exemplary method 64 may be configured to prioritize 74 the refreshing of the items 14 based on the refresh utilities. Having computed a utility-based allocation of refreshing of the items 14 in the item cache 12 according to the query frequencies 32 and update frequencies 36 pertaining thereto, the exemplary method 60 thereby contributes to an efficient allocation of cache refreshing resources 22, and so ends at 76.

Figure 5:
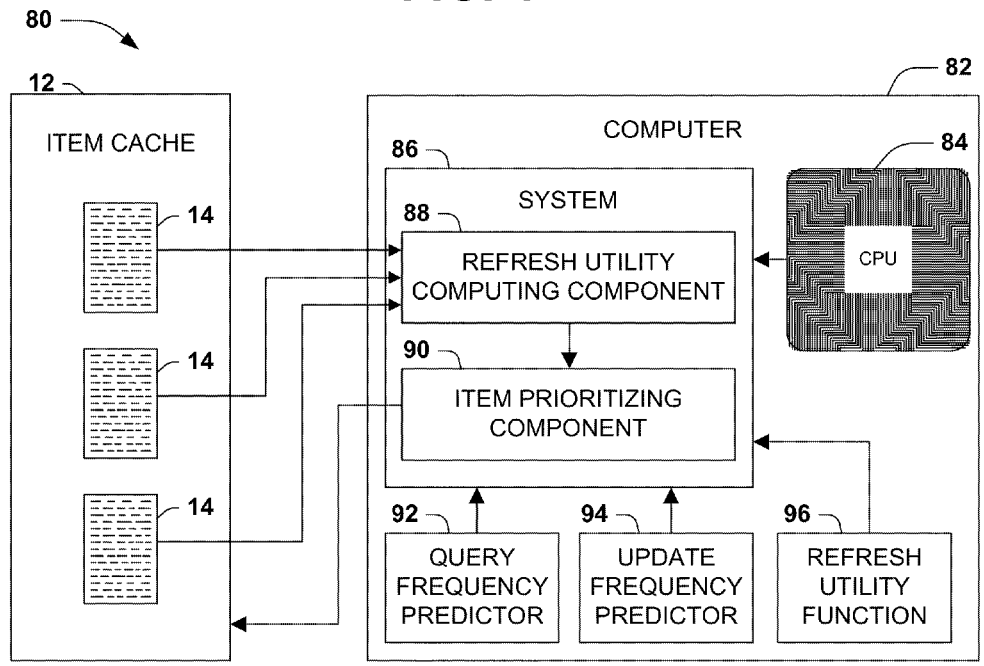
FIG. 5 is a component block diagram illustrating an exemplary system configured to prioritize a refreshing of items provided in response to queries and stored in an item cache.

FIG. 5 illustrates a second embodiment of the techniques discussed herein, presented in an exemplary scenario 80 involving an item cache 12 storing a set of items 14 that are serviced by a computer 82. The computer 82 may, e.g., also comprise one or more cache refreshing resource 22; or may be configured to prioritize the items 14 so that at least one other computer having cache refreshing resources 22 may allocate such refreshing resources in an efficient manner; or may evaluate the utility of refreshing the items 14 to assist with the acquisition of additional cache refreshing resources 22; etc. The computer 82 comprises a processor 84, which may be configured, e.g., to execute instructions that form an architecture of a system 86 presented herein, which is configured to prioritize the refreshing of items 14 provided in response to queries, and where respective items 14 corresponding to a source item 18 retrieved from a source item host 16 accessible to the computer 82. Within this exemplary scenario 80, the system 86 may comprise a refresh utility computing component 88, which may be configured to compute a refresh utility of the items 14 stored in the item cache 12. This computing may be achieved for respective items by predicting a query frequency 32 of queries requesting the item 14; by predicting an update frequency 36 of the source item 18 by the source item host 16; and by computing a refresh utility of the item 14 based on the query frequency 32 and the update frequency 36. This component may utilize, e.g., a query frequency predictor 92 to predict the frequency with which an item 14 may be requested in queries (e.g., according to historic logs of such queries); an update frequency predictor 94 to predict the updating of the source item 18 corresponding to the item 14 (e.g., according to a monitoring of updates to the source item 18 over a particular period); and a refresh utility component 96 to compute the refresh utility of the item 14 based on the query frequency 32 and the update frequency 36. The exemplary system 86 may also comprise an item prioritizing component 90, which may be configured to prioritize the refreshing of the items 14 based on the refresh utilities computed by the refresh utility computing component 88. The exemplary system 86 thereby achieves the prioritization of the items 14 in the item cache 12 according to the comparative utility of refreshing the items 14 with the corresponding source items 18 provided by the source item hosts 16.

Figure 6:
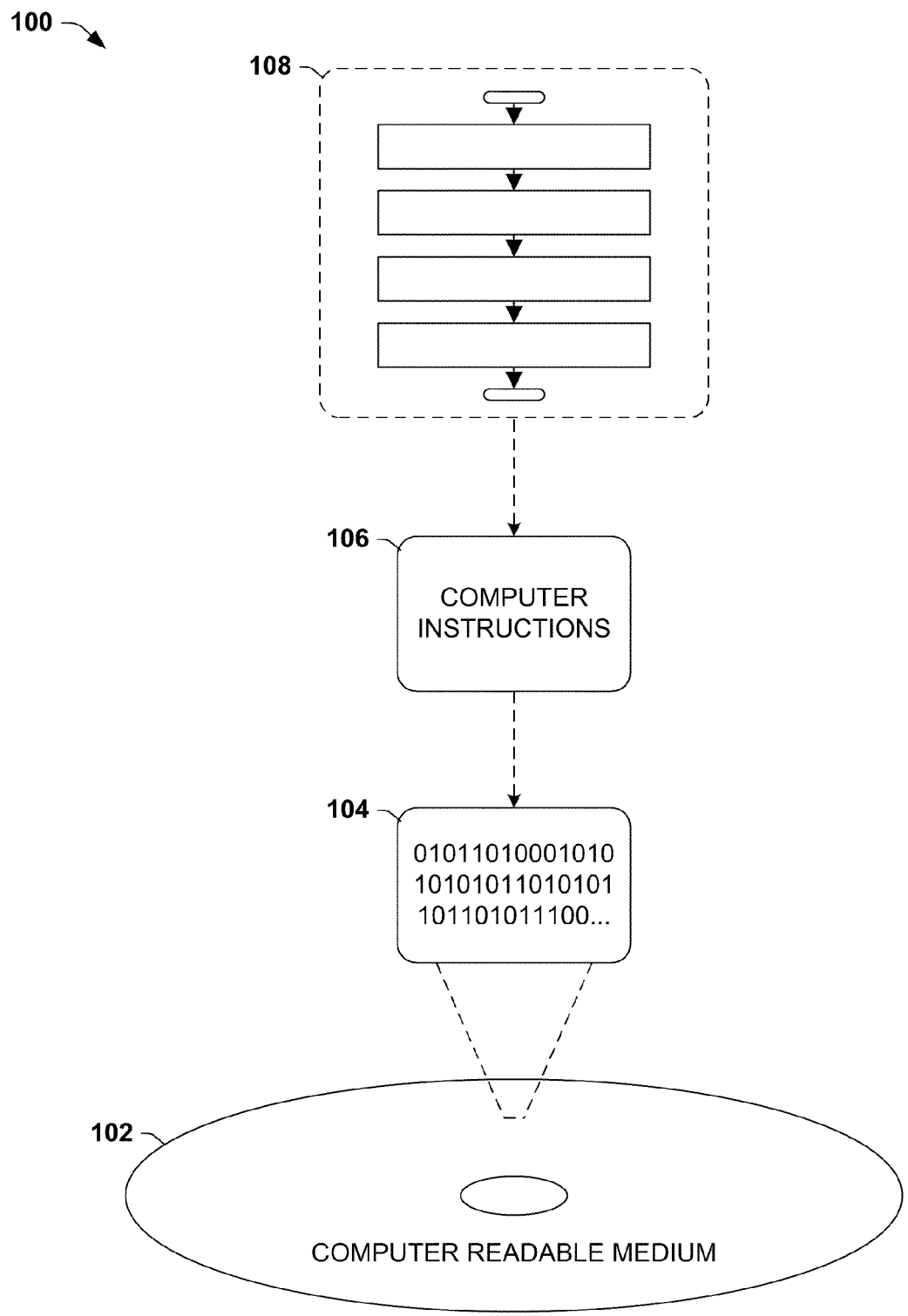
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of prioritizing a refreshing of items provided in response to queries and stored in an item cache, such as the exemplary method 60 of FIG. 4. In another such embodiment, the processor-executable instructions 106 may be configured to implement a system for prioritizing a refreshing of items provided in response to queries and stored in an item cache, such as the exemplary system 86 of FIG. 5. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 4 and the exemplary system 86 of FIG. 5) to confer individual and/or synergistic advantages upon such embodiments.

A first aspect that may vary among embodiments of these techniques relates to the scenarios in which the techniques may be utilized. As a first variation, a web proxy may be positioned between a large body of users and the internet in order to detect web pages that are frequently requested by the users, to store a cached version of such web pages, and to provide the cached version of the web page upon request. The web proxy may therefore conserve network throughput by reducing redundant requests for a particularly popular web resource by a large number of users. However, because the set of pages requested by users is potentially unlimited, it may not be feasible to cache all requested pages. Moreover, even with a constrained set of frequently requested pages, it may not be possible to poll the sources of such web pages often enough to guarantee freshness, due to both the high frequency with which many pages may be updated and the limited computing and network resources that may be available for performing the refreshing. Therefore, the web proxy may have to allocate the refreshing resources across the set of items in the item cache in such a manner to reduce the incidence of stale pages provided to users. Accordingly, the techniques discussed herein may be adapted for use with the proxy cache; e.g., if the source items comprising web-accessible source items hosted by webservers, and the item cache 12 comprises a proxy cache, the techniques described herein may be configured to store in the proxy cache the web-accessible source items 18 that are frequently requested by the users, and to provide an item 14 from the item cache 12 that corresponds to a web-accessible source item 18 requested by a user.

As a second variation of this first aspect, the techniques discussed herein may be applied to a web search engine that discovers web resources (e.g., web pages, data provided by web services, or dynamic images hosted by webservers) on at least a portion of the web (e.g., a particular domain or LAN, or web pages on a particular topic, or the entire worldwide web.) The web search engine may comprise an item cache 12 of items 14 representing various web resources, such as web pages, that may be used to provide search results in response to queries submitted by users for web resources that match particular criteria. The items 14 in the item cache 12 might represent the content of the corresponding source items 18, or might represent metadata identified about such source items 18 (e.g., keywords, categories, and page rankings) that may facilitate the generation of query results. However, as the corresponding web resources stored by the webservers change, the items 14 in the item cache 12 may have to be refreshed in order to promote the use of up-to-date information about the web resources in preparing and providing query results. For example, a web page comprising a movie listing may change often, and the web search engine may frequently update the page or result set stored in the cache corresponding to the movie listing in order to include and position the movie listing page in the result set of queries that may include movie titles. Therefore, the techniques discussed herein may be utilized to maintain the item cache 12 of the web search engine; e.g., if the source items 18 comprising web-accessible source items 18, and if the source item hosts 16 comprising webservers hosting the web-accessible source items 18, then the item cache 12, representing the web search cache, may be configured to identify web-accessible source items 18 corresponding to web queries received from web users.

The techniques discussed herein may also be applied to maintain the freshness of cached items 14 other than web resources. As a third variation, a database server may be configured to answer many types of queries based on highly dynamic data, and certain queries may be frequently applied to the database. A database query cache might endeavor to store and refresh up-to-date results from a set of commonly executed queries, instead of redundantly applying each received query to the database. However, the set may be sufficiently large, or the processing of the queries may be so computationally expensive, that the query results might be refreshed only occasionally. The database query cache may therefore have to prioritize the refreshing of queries in order to achieve an efficient allocation of the computational resources available for promoting the freshness of the database query cache. As a fourth variation, a local data search engine might be devised to perform local data searches among the objects comprising a computing environment (e.g., files contained on a network file server), and a search cache may be used to store and provide rapid access to commonly executed queries at a reduced computational and network cost. However, the local data search engine may not be able to monitor all file accesses for updates that affect the results of such commonly executed queries, and may not be able to poll the file server quick enough to guarantee up-to-date results; therefore, the local data search engine might prioritize the refreshing of results for commonly executed queries. Those of ordinary skill in the art may devise many scenarios involving an item cache 12 storing items 14 to which the techniques discussed herein may be applied.

A second aspect that may vary among embodiments of these techniques relates to the manner of predicting the query frequency 32 of a particular item 14. Many predictive techniques may be utilized in this capacity. As a first variation, requests issued to various items 14 may be tracked over a period of time, such as by recording requests for particular web-accessible items 14 in a web access log. A query frequency 32 for a particular item 14 may then be predicted by computing a query frequency 32 for the item 14 based on the rate of queries detected during the tracking, such as by evaluating the web access log to identify a set of commonly requested web-accessible items 14. The set of query frequency predictions may then be aggregated, e.g., by generating an item query frequency set that maps items 14 to predicted query frequencies. The item query frequency set may then be utilized (e.g., by the query frequency predictor 92 illustrated in FIG. 5) during the computation of the refresh utilities of various items 14. Query frequencies of particular items 14 may change over time (e.g., as user preferences and behaviors for visiting particular websites change), and if the query frequency set is not updated periodically, it may attribute overly high refresh utilities for items 14 that are no longer heavily requested, and overly low refresh utilities for items 15 that are now more heavily requested than before.

Other variations of this second aspect may also be compatible with the techniques discussed herein. As a second variation, the item cache 12 may itself identify query frequencies; e.g., a web proxy may track the rate of requests for particular items 14 in order to maintain the proxy cache, such as by evicting unused items 14 in order to make room for new items 14. The techniques discussed herein may consume the query frequency information generated by the item cache 12 and may use this information in order to compute the refresh utilities 40 of the items 14. As a third variation, another source of query frequency information may be utilized, e.g., a report by a web tracking service that tracks the popularity of various web-accessible items (such as web pages) as general user preferences of internet users change. This variation may be advantageous where the sources of queries change frequently, such as a web proxy servicing a public WiFi location with high turnover in the user population. As a fourth variation, the query frequencies may be determined analytically (e.g., by a code profiler of a data-driven application that automatically identifies queries that the application often applies to a database) and/or heuristically (e.g., by a set of items identified by a network administrator that, based on the knowledge of the network administrator, are likely to be requested often by users.)

As a fifth variation, the prediction of query frequencies for an item 14 may be predicted through the development and application of a probabilistic classifier for queries made to items. Such a classifier may be developed by monitoring the frequencies of accesses of items 14 as well as multiple aspects of the content of the source items 18, such as link structure, anchor text, and such contextual factors as the topics and keywords of breaking news stories. Probabilistic classifiers may be developed to predict the dynamics of such frequencies of querying of respective items 14. For example, machine learning methods may be trained on data so as to learn to predict queries for an item 14 containing information on a breaking news story. The training data might include information from multiple cases, where each news story is formulated into a set of attributes about the story (e.g., relative location to populations of users, degree of catastrophe, celebrity, etc.), and data about the dynamics of the resulting query frequencies of such items 14. As one example, a trained classifier may predict that interest and thus frequencies of queries of an item 14 representing a news story tends to rise at the time of the breaking of the news story or a story about a related topic that has been determined to have dependencies with interest based on similar or analogous histories of dependency (with dynamics described, e.g., as a sigmoid function with specific predicted parameters), and then decay in interest with a parameterized function (e.g., an exponential decay after some plateauing, as captured by parameters describing the plateau and the half-life of the decay).This may be achieved, e.g., by training the probabilistic classifier to predict query frequencies of items 14 based on a training item set comprising items associated with known query frequencies, and subsequently applying the probabilistic classifier to an item 14 to predict the query frequency of the item. Those of ordinary skill in the art may devise many ways of predicting the query frequencies for the items 14 stored in the item cache 12 while implementing the techniques discussed herein.

A third aspect that may vary among embodiments of these techniques relates to the manner of predicting the update frequency 36 of a source item 18. This factor may be more difficult to predict than query frequencies 32 (e.g., because query frequencies may be predicted from the aggregated behaviors of a large group of users; while the update frequency 36 may vary widely from one source item 18 to another source item 18.) A first variation of this third aspect may be based on the concept that particular criteria may be identified regarding a particular source item 18, where such criteria that may be relevant in predicting the update frequency 36 of the source item 18. These criteria might be extracted, e.g., through an automated parsing of the source item 18 (e.g., a natural language parser that may attempt to identify the type of content in a web page), an examination of metadata associated with the source item 18 (e.g., looking at date attributes of the source item 18 to determine when it was first created or last updated), or an examination of other factors that might lead to criteria relevant to the prediction of the update frequency of the source item 18 (e.g., an identification of the type of entity that manages the source item 18.)

Figure 7:
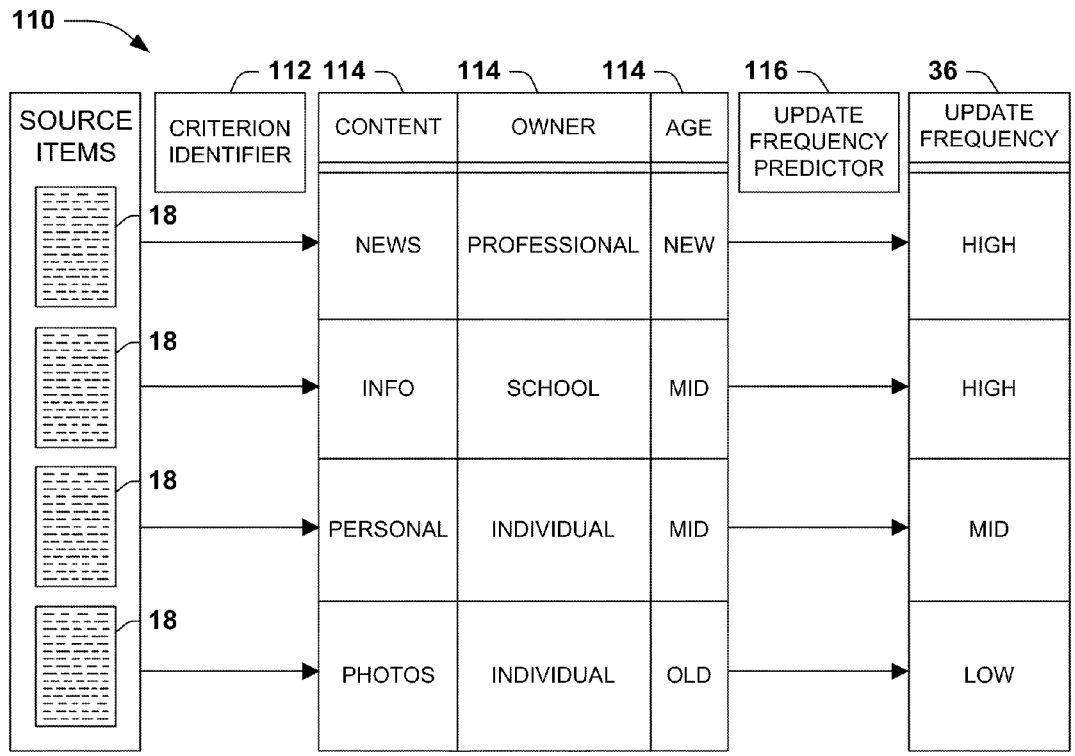
FIG. 7 is an illustration of an extraction of criteria from a set of source items and a set of predicted updated frequencies computed therefrom.

FIG. 7 illustrates an exemplary scenario 110 involving an extraction of a set of source item criteria 114 that may assist in the prediction of the update frequencies 36 of various source items 18. In this exemplary scenario 110, respective source items 18 may be examined to extract a set of source item criteria regarding each source item 18, such as the content of the source item 18 (e.g., news, information, personal narratives, or sets of photos or other images); the type of owner of the source item 18 (e.g., a professional organization, such as a corporation; a school or other community group; or an individual); and the age of the source item 18 (e.g., a comparatively old source item 18, a comparatively new source item 18, or a comparatively middle-age source item 18.) When these source item criteria 114 have been extracted for any particular source item 18, the source item criteria 114 may be used to predict the update frequency 36. For example, a source item 18 identified as containing news-type content, as being owned and managed by a professional corporation, and as comprising a comparatively new source item 18 (in terms of its creation date and/or date of last modification) may be predicted as having a comparatively high update frequency 36, while another source item 18 identified as containing personal content by an individual (e.g., a weblog) and having comparatively middle-age entries may be predicted as having a mid-level update frequency 36. In this manner, an update frequency 36 may be predicted for the source items 18, which may, in turn, be used to predict the refresh utilities thereof.

The exemplary scenario 110 of FIG. 7 involves two types of processing applied to the source items 18: an extraction of source item criteria 114 relating to the source items 18 that may be relevant in predicting the update frequency 36, and the prediction of the update frequency 36 based on the source item criteria 114. The extraction of the source item criteria 114 (as performed, e.g., by a criterion identifier 112) may involve many types of analysis. As a first example, an analysis of text contents of source item 18 may reveal various properties, such as semantics, style, vocabulary, and complexity, that may be correlated with various source item criteria 114 (such as a type of content 114 present in a web page.) As a second example, if the source items 18 comprise a type of media object, various forms of media analysis may be utilized to extract criteria about the media object; e.g., image processing techniques may be utilized to determine whether an image comprising the source item 18 is a photograph, a drawing, a painting, or a computer rendering. As a third example, aspects of the source item 18 may be compared with a knowledge source to extract relevant source item criteria 114; e.g., a database of websites that identifies types of owners of particular websites might be referenced to identify the type of owner of a particular source item 18 hosted by a referenced website. As a fourth example, metadata associated with the source item 18 may be examined to extract relevant source item criteria 114; e.g., the date of creation or the date of last modification of a source item 18 may be examined to extract the age of the source item 18.

Once these source item criteria 114 have been extracted, the source item criteria 114 may be examined together to predict the update frequency 36, which may be based, e.g., on typical update frequencies 36 that have been previously predicted and/or identified of source items 18 sharing some or all of the source item criteria 114 of the source item 18. As a first example, different criteria 14 may be associated with different correlative weights in predicting the update frequency; e.g., the age of a source item 18 may be more relevant to the update frequency 36 than a type of owner of the source item

18. Moreover, patterns of source item criteria 114 may be identified; e.g., the owner of a source item 18 may be more relevant to the predicted update frequency 36 if the content is a type of news than if the content is information. It may be appreciated that many information processing techniques may be used to perform the extraction of source item criteria 114 and the prediction of the update frequency 36 based thereupon, such as machine learning techniques, including expert systems, neural networks, genetic algorithms, and Bayesian classifiers; knowledge mining and statistical analyses; and heuristics extracted from such techniques or specified by an administrator.

Figure 8:
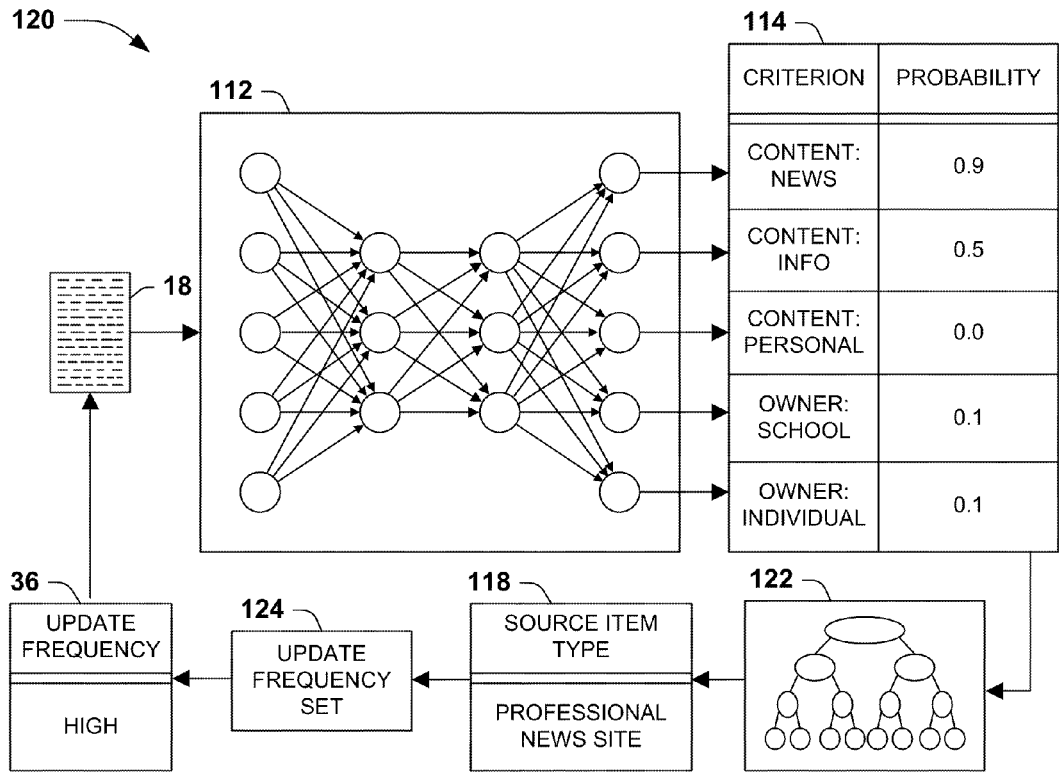
FIG. 8 is an illustration of a computation of a predicted update frequency for a source item.

As one such example, the update frequency 36 may be predicted by first classifying the source item 18 as a source item type according to at least one source item criterion 114, and then predicting the update frequency of the source item 18 based on typical update frequencies of source items of the selected source item type, such as may be heuristically specified or statistically measured. FIG. 8 illustrates an exemplary scenario 120 utilizing a particular embodiment of this analytic process to predict an update frequency 36 of a source item 18 according to several knowledge processing techniques. From the source item 18, several source item criteria 114 may be identified by applying a criterion identifier 112 formulated as a backpropagation neural network. This neural network might be devised, e.g., by providing a set of training data comprising exemplary source items 18, each having a known set of source item criteria 114 (e.g., probabilities that the exemplary source item 18 contains news content, informational content, or personal content; the probability that the owner of the source item 18 is a school, an individual, or another type of owner; etc.) The neural network 112 may be trained to provide acceptable output for the respective source item criteria 114 when provided the exemplary source items 18, and then may be applied to the source item 18 to extract source item criteria 114.

As the exemplary scenario 120 of FIG. 8 further illustrates, the extracted source item criteria 114 may be provided to an update frequency predictor 116. For example, the update frequency predictor 116 may be configured to predict the update frequency 36 of the item based on the extracted criteria 114. First, the criteria 114 may be evaluated to determine the source item type 118, such as by a source item type identifier 122. As one example, the source item type identifier 122 might comprise a Bayesian classifier system, which may be configured to classify the source item 18 according to the extracted source item criteria 114 as a source item type (e.g., a professional news site, a personal weblog, an image gallery, or an academically produced data source.) The Bayesian classifier system may be developed using a training data set comprising source item criteria 114 and known source item types 118, and may be configured to compute statistical correlations and weights of the source item criteria 114 to various source item types 118. The Bayesian classifier system may then prioritize the source item criteria 114 in an evaluative order, where each evaluation is selected to narrow the field of likely source item types 118 to a smaller set of more highly probable source item types 118 in view of previous evaluations. The Bayesian classifier system, once developed, may then be utilized as a source item type identifier 122 by applying it to the source item criteria 114 extracted from the source item 18 in order to identify the source item type 118 of the source item 18.

Once a source item type 118 is identified for the source item 18, the update frequency 36 of the source item 18 may be predicted based on the source item type 18. This prediction may be made, e.g., by the update frequency predictor 116, based on an update frequency set that identifies typical update frequencies of source items 18 of various source item types. For example, a review of professional news items may indicate that such items are updated at a high update frequency (e.g., once every ten minutes); that personal weblogs tend to be updated at a medium frequency (e.g., once every few hours); and that academically generated data sources tend to be updated at a low frequency (e.g., once every six months.) An update frequency set 124 may be derived that maps respective source item types to a typical update frequency 36 for source items 18 of the source item type. The update frequency set 124 may be generated automatically, e.g., by monitoring update frequencies 36 of some source items of known source item types and computing an average update frequency 36, and/or heuristically, e.g., specified by an administrator based on personal knowledge. The update frequency set 124, once generated, may be used to predict the update frequency of the source item 18 by the source item host 16. Thus, in this exemplary scenario 120, the source item 18 is first evaluated by the criterion identifier 112 to extract source item criteria 114, which are then provided to the update frequency predictor 116, which first classifies the source item 18 as a source item type 118 by evaluating the source item criteria 114 by the Bayesian classifier system 112, and then predicts the update frequency 36 based on the update frequency set 124. However, the exemplary scenario 120 of FIG. 8 presents only one feasible combination of machine learning systems, statistical analyses, and heuristics that may predict the update frequency 36 of the source item 18. Those of ordinary skill in the art may devise many evaluative methodologies for predicting the update frequency 36 of the source item 18 while implementing the techniques discussed herein.

A fourth aspect that may vary among embodiments of these techniques relates to the computing of the refresh utility of the item 14, based on the predicted query frequency 32 of the item 14 and the predicted update frequency 36 of the source item 18. The refresh utility may be computed in many ways. As a first example, some computations may involve a comparatively simple implementation and a comparatively low computational intensity, whereas other computations of the refresh utility may present greater proficiency in the scheduling of refreshing of the items 14, such as by taking into account the other items 14 to be refreshed and the comparative penalties of serving stale versions of different items 14. As a second example, the refresh utility may be computed, e.g., as a refresh frequency representing an acceptable frequency of refreshing the item 14; as a score indicating the urgency of refreshing the item 14 at a particular time; or as a prioritization of the items 14 of the item cache 12 (such as in the exemplary scenario 50 of FIG. 3.)

A particular variation of this fourth aspect involves computing the refresh frequency 36 of an item 14 according to the refresh utility, i.e., a measure of the utility achieved by allocating resources to refresh the item 14. It may be appreciated that the proficiency of the item cache 12 at any particular moment may be measured for each item 14 as the query frequency 32 and whether or not the version of the item 14 served from the item cache 12 is up-to-date. Inversely, for each item 14 (represented as i) and at any time point (represented as t), the cache penalty involved in using the item cache 12 (represented as penalty$_i$) may be viewed as the query frequency of the item 14 (represented as u$_i$) and whether or not the version of the item 14 served from the item cache 12 is stale (represented as cost$_i$, either comprising 1 if the item 14 is stale and 0 if the item is not stale):

$$\text{penalty}_i = u_i \cdot \text{cost}_i(t)$$

This penalty may also be measured over the entire set of items 14 in the item cache 12 (the items i enumerated from 1 to n), and over an entire period of time, according to the mathematical formula:

$$\text{penalty} = \Sigma_t \Sigma_n u_i \cdot \text{cost}_i(t)$$

The efficiency of a particular allocation of cache refreshing resources 22 may be measured as the reduction in this penalty over time.

This mathematical formula may also be applied to measure the marginal value in updating a particular item 14 at a particular time point, i.e., as the achieved decrease in the overall penalty. This value measurement may then be utilized as a comparative determination of the utility in updating the item 14 to the overall freshness of the item cache 12. However, the cost may be difficult to determine as a binary value, since it is not necessarily known whether the version of an item 14 served from the item cache 12 is current. Instead, this cost may be estimated as a probability that the item 14 in the item cache 12 is out of date, based on the predicted update frequency 36 of the corresponding source item 18 and the last refreshing of the item 14. Thus, if the update frequency 36 (represented as $u_i$) may be predicted, a freshness probability that the item 14 (represented as $c_i$) may be computed to represent the probability that the source item 18 has not been updated by the source item host 16 since the item 14 was last refreshed (i.e., that the version of the item 14 in the item cache 12 is fresh at a particular time point.) In similar fashion, the decision of whether or not to refresh the item 14 at this time point may be expressed as a refresh probability, represented as $p_i$, that item i will be chosen for refreshing during the current time point (thereby reducing $c_i$ to 0), and the probability that if item i is not chosen for updating $(1-p_i)$, the item is currently fresh, taking into account both the update frequency $c_i$ and the current probable freshness of the item 14. Accordingly, the utility of refreshing an item may be expressed according to the mathematical formula:

$$x_{t+1}^i = p_i + x_t^i \cdot (1-c_i) \cdot (1-p_i)$$

where $x_{t+1}^i$ represents the utility during the next time point.

These observations may be utilized in computing the refresh utilities of particular items 14 in order to reduce this probability. For example, the refresh utility for a particular item 14 may be computed as the utility achieved (relative to the overall freshness of the item cache 12) by refreshing the item 14. The refresh utility (such as the refresh frequency) of an item 14 may be computed based on the query frequency 32 of queries requesting the item 14, and also on the update probability of the source item 18 by the source item host 16, where the refresh probabilities are selected in order to yield a desirably high refresh utility. In one such embodiment, the refresh utility may be computed as a refresh probability for the item 14, representing the probability that the item 14 is to be chosen for refreshing by a cache refreshing resource 22 at time point t. This stochastic approach may permit an occasional refreshing of items 14 with a consistently low computed refresh utility, which might otherwise never be refreshed in some strictly deterministic approaches. Additionally, after at least one item 14 in the item cache 12 is refreshed, the refresh probabilities of respective items 14 may be recomputing based on the query frequencies 32 of queries requesting the items 14 and the update probability of the corresponding source items 18 by the source item hosts 16 (which may be higher for items 14 that have not been refreshed, and may be lower or 0 for items 14 that have been refreshed.) This iterative computation, use, and re-computation of the refresh utilities of respective items 14 may therefore promote the efficient allocation of the cache refreshing resources 22 to achieve a desirably high utility and a correspondingly low cache penalty. In particular, these views of the utility of cache refreshing may be expressed as an optimization problem, such as a refresh utility model.

One such expression is the mathematical formula:

$$\max \Sigma_{t=1}^T (\Sigma_{i=1}^n x_t^i \cdot u_i)$$

such that:

$$\Sigma p_i \leq 1,$$

$$p_i \geq 0,$$

$$0 \leq x_t^i \leq 1,$$

$$x_0^i = 0, \text{ and}$$

$$x_{t+1}^i = x_t^i \cdot (1-c_i) \cdot (1-p_i) + p_i;$$

wherein:

n represents the number of items in the item cache;

t represents a time point;

$u_i$ represents a query frequency of item i;

$x_t^i$ represents a probability that source item i has been updated by the source item host at time t since the item was last refreshed;

$c_i$ represents a freshness probability comprising a probability that the source item i has not been updated by the source item host of source item i since the item i was last refreshed; and $p_i$ represents a refresh probability of item i at time t.

However, this item subset may include one or more items 14 with a refresh probability less than zero, indicating that it is not helpful to refresh the item 14 in view of the other items 14 of the item subset. Moreover, the inclusion of this item may skew the computation of the Lagrange multiplier. Therefore, it may be helpful to select the item subset as a possible solution (i.e., as an acceptable set of items 14 with computed refresh probabilities) only if none of the items 14 of the item subset comprise a refresh probability less than zero. If not, the item(s) 14 added to the item subset during this iteration may be excluded from further consideration. Additionally, the aggregate utility of the item subset may be computed (i.e., as the achieved reduction in the cache penalty using the selected item subset), and the current item subset may be accepted as a possible solution only if the aggregate utility is better than the aggregate utilities computed for other item subsets. In this manner, a subset of items 14 may be identified, along with an acceptable set of refresh probabilities for a particular time increment, that produce an acceptable and advantageously high utility when applied to the refreshing of the item cache 12.

The mathematical formula presented above may be used as a model for calculating the refresh utilities of the items 14 in the item cache 12 by choosing appropriate probabilities ($p_i$) of updating respective items 14. However, choosing all such $p_i$ values for all items 14 may present a difficult challenge in the field of linear programming, and some solutions, such as brute-forcing or heuristics-based selection of $p_i$ values, may be inaccurate or prohibitively computationally intensive. However, the model may be reformulated in a few ways to produce techniques that are computationally feasible and acceptably accurate. In one useful reformulation, the goal function $F(p_1, \ldots, p_n)$ may be computed according to the mathematical formula:

$$F(p_1, \ldots p_n) = \sum_i \frac{u_i p_i}{p_i + c_i - p_i c_i}$$

which can then be used to compute efficient $p_i$s values for use in these techniques.

A first technique based on these models involves a set-based approach, wherein an initially small subset of items 14 may be selected. For the items 14 of the item subset, a Lagrange multiplier may be computed to model the achievable utility of the subset in view of the query frequencies 32 and the freshness probabilities (predicted in view of the update frequencies 36 of the corresponding source items 18.) After the Lagrange multiplier is computed for the item subset, refresh probabilities may be computed for the items 14 of the item subset, based on the Lagrange multiplier as well as the respective query frequency 32 and the update frequency 36. The items 14 in the resulting item subset include refresh probabilities based on the aggregate achievable utility for the selected subset of items. Specifically, the exemplary useful reformulation of $F(p_1, \ldots, p_n)$ may be computed according to the mathematical formula:

$$p_i = \frac{\sqrt{\frac{u_i c_i}{\lambda}} - c_i}{1 - c_i}$$

wherein $\lambda$ may be computed (subject to a constraint $\Sigma_i p_i = 1$) according to the mathematical formula:

$$\lambda = \left( \frac{\sum_i \frac{\sqrt{u_i c_i}}{(1 - c_i)}}{1 + \sum_i \frac{c_i}{1 - c_i}} \right)^2.$$

However, this item subset may include one or more items 14 with a refresh probability less than zero, indicating that it is not helpful to refresh the item 14 in view of the other items 14 of the item subset. Moreover, the inclusion of this item may skew the computation of the Lagrange multiplier. Therefore, it may be helpful to select the item subset as a possible solution (i.e., as an acceptable set of items 14 with computed refresh probabilities) only if none of the items 14 of the item subset comprise a refresh probability less than zero. If not, the item(s) 14 added to the item subset during this iteration may be excluded from further consideration. Additionally, the aggregate utility of the item subset may be computed (i.e., as the achieved reduction in the cache penalty using the selected item subset), and the current item subset may be accepted as a possible solution only if the aggregate utility is better than the aggregate utilities computed for other item subsets. In this manner, a subset of items 14 may be identified, along with an acceptable set of refresh probabilities for a particular time increment, that produce an acceptable and advantageously high utility when applied to the refreshing of the item cache 12.

FIG. 9 presents a first exemplary algorithm 130 configured in accordance with this first technique, illustrated as a first pseudocode block 132 that is reliant on a series of smaller computations that are presented respectively in second pseudocode block 134, a third pseudocode block 136, and a fourth pseudocode block 138. It may be appreciated that these pseudocode blocks are not limited to the syntactic or computing constraints of any particular computer language or system architecture. Rather, the pseudocode blocks are provided as a high-level representation of a computational application of the first technique to the computation of refresh probabilities of the items 14 of an item cache 12.

In the first pseudocode block 132, a function is provided that accepts two arrays referencing the items 14 of the item cache 12: a first array that indexes the items 14 according to the predicted query frequencies 32 thereof (represented as $\vec{u}$) and a second array that indexes the items 14 according to the freshness probabilities of the items 14 in the item cache 12, based on the predicted update frequencies 36 of the corresponding source items 18 (represented as $\vec{c}$.) The function begins by sorting the arrays according to a ratio of the query frequency 32 to the freshness probability. A high ratio is indicative of an item 14 that is of comparatively higher value to refresh, and a lower ration is indicative of an item 14 of comparatively lower value. The function then endeavors to choose subsets of items 14 and to compute refresh probabilities therefor that may produce an aggregate high refresh utility. For example, an item subset may be selected and the items 14 thereof sorted according to the $$\frac{u_i}{c_i}$$

ratio. The Lagrange probability may then be computed over the item subset, utilizing the Lagrange probability computation expressed in the second pseudocode block 134; and based on the Lagrange probability calculation, the update probabilities 136 of the respective items 14 may be computed (using the iterative refresh probability computation expressed in the third pseudocode block 136.) The item subset may then be tested, first by determining that no items 14 in the item subset have refresh probabilities less than zero, and then by determining the aggregate refresh utility of the item subset (using the aggregate utility computation expressed in the fourth pseudocode block 138.) If the aggregate utility computation of the item subset is better than that computed for previous item subsets, the item subset may be selected as a possible solution. The iterative testing of item subsets may continue until the entire set of items 14 is tested. The item subset having the highest aggregate utility may then be selected, and the refresh probabilities attributed to the items 14 of this item subset may be used to prioritize the items 14 for refreshing.

While the first technique (and the first exemplary algorithm) figure may generate an acceptable solution, some inefficiencies may arise in at least two aspects. First, the items 14 that present an unacceptable $$\frac{u_i}{c_i}$$

ratio continue to be considered in subsequent iterations (since, during each iteration, the item subset comprising items 1 through n is considered.) The continued consideration of items 14 that are not advantageous to refresh may lead to the computation of iterations that are not likely to be selected as potential solutions. Second, the first technique might fail to test and select an acceptable subset (1:(m−1)+(m+1):n) (where m<n), where item m has an unacceptable $$\frac{u_i}{c_i}$$

ratio.

A second technique based on these models may therefore be devised that, in contrast with the set-building process of the first technique and the exemplary algorithm 130 of FIG. 9, is formulated as a set-reducing technique. According to this second technique, the entire set of items 14 may be considered, and unhelpful items 14 (those having an unacceptable $$\frac{u_i}{c_i}$$

ratio) may be iteratively identified and removed, until an item subset is identified where all included items 14 have an acceptable $$\frac{u_i}{c_i}$$

ratio.

FIG. 10 presents a second exemplary algorithm 140 configured in accordance with this first technique, illustrated as a first pseudocode block 142 that is reliant on the smaller computations expressed in the smaller pseudocode blocks of FIG. 9. Again, it may be appreciated that this pseudocode block is limited to the syntactic or computing constraints of any particular computer language or system architecture. Rather, the pseudocode block is provided as a high-level representation of a computational application of the second technique to the computation of refresh probabilities of the items 14 of an item cache 12.

In the first pseudocode block 142, a function is provided that accepts two arrays referencing the items 14 of the item cache 12: a first array that indexes the items 14 according to the predicted query frequencies 32 thereof (represented as $\vec{u}$) and a second array that indexes the items 14 according to the freshness probabilities of the items 14 in the item cache 12, based on the predicted update frequencies 36 of the corresponding source items 18 (represented as $\vec{c}$.) The function begins by forming an item subset comprising all of the items 14 of the item cache 12. A Lagrange multiplier may be computed over the items 14 of the item subset, based on the query probabilities of the items 14 and the update probabilities of the corresponding source items 18, such as according to the second pseudocode block 134 of FIG. 9. The refresh probabilities of the items 14 in the item subset may then be computed using the Lagrange multiplier, such as according to the third pseudocode block 136 of FIG. 9. The item subset may then be examined for at least one item 14 having a refresh probability less than zero. If any such items 14 are identified, these items 14 are removed from the item subset; the Lagrange multiplier and refresh probabilities may be recomputed; and the item subset may be retested for items 14 having a refresh probability less than zero. This iterative testing, removing, and recomputing may continue until no further items 14 having a refresh probability less than zero are included in the item subset. The item subset may then be selected as the solution, wherein the refresh probabilities computed for the items 14 of the item subset may be used to allocate the cache refresh resources 22. By removing items 14 that have unacceptable $$\frac{u_i}{c_i}$$

ratios, and by iteratively removing all such items 14 after each computation of the refresh probabilities and retesting the remaining item subset, the second exemplary algorithm 140 therefore improves on the first exemplary algorithm 130 by involving fewer computational iterations. Additionally, the second technique is capable of testing item subsets that are not considered in the first technique, and may therefore identify an improved solution of computed refresh probabilities.

The first technique (illustrated by the first exemplary algorithm 130) and the second technique (illustrated by the second exemplary algorithm 140) are devised to provide accurate solutions. However, these techniques may involve significant computational resources, especially if the item set is large (e.g., an item cache 12 utilized by a web search engine may contain billions of items 14.) Therefore, in some scenarios, it may be desirable to compute the refresh utilities and the refresh probabilities in an approximated manner, thereby reducing the computational resources involved in the computation of resource probabilities in exchange for a modest (and perhaps small or negligible) reduction in accuracy.

A third technique may therefore be devised that approximates the allocation of refresh probabilities based on the improvement in the aggregate refresh utility that may be achieved thereby. In particular, the allocation of refreshing may be modeled as a gradient descent problem involving an iterative and incremental allocation of the refresh probabilities. Each allocation may be selected by computing the derivative flux in the refresh utility of each item 14 (i.e., the marginal improvement in refresh utility) if a refresh probability increment were allocated to it, based on the query frequency, the update frequency, and the refresh probability that has already been allocated to the item 14. The item 14 featuring the maximum derivative flux may be allocated a refresh probability increment from the allocatable refresh probability, which is reduced by the refresh probability increment. The gradient descent selection may continue until the allocatable refresh probability has been exhausted, and the cache refresh resources 22 may be deployed according to the refresh probabilities allocated among the items 14.

FIG. 11 illustrates an exemplary third algorithm 150 utilizing this third technique, illustrated as a first pseudocode block 152 that is reliant on a smaller computation presented in a second pseudocode block 154 that achieves the computation of the derivative flux of an item 14 if allocated a refresh probability increment. Again, it may be appreciated that these pseudocode blocks are not limited to the syntactic or computing constraints of any particular computer language or system architecture. Rather, the pseudocode blocks are provided as a high-level representation of a computational application of the third technique to the computation of refresh probabilities of the items 14 of an item cache 12.

In the first pseudocode block 152, a function is provided that accepts two arrays referencing the items 14 of the item cache 12: a first array that indexes the items 14 according to the predicted query frequencies 32 thereof (represented as $\vec{u}$) and a second array that indexes the items 14 according to the freshness probabilities of the items 14 in the item cache 12, based on the predicted update frequencies 36 of the corresponding source items 18 (represented as $\vec{c}$.) The function also accepts the number of iterations to be performed in the gradient descent (represented as N), wherein higher values of N result in a finer-grained allocation of the refresh probabilities and produce a more accurate result, but involve more computational resources to complete. The first pseudocode block 152 begins by computing the refresh probability increment (represented as $\epsilon$) and initializing the items 14 with a zero refresh probability. The derivative flux may then be computed for the items 14, as expressed in the second pseudocode block 154. Next, the refresh probability increments may be iteratively allocated by choosing the item 14 with the highest derivative flux, allocating a refresh probability increment to the item 14, and recomputing the derivative flux for the item 14 if an additional refresh probability increment were added to it. (It may be appreciated that the items 14 having a disadvantageous $$\frac{u_i}{c_i}$$

ratio are simply never selected, because the derivative flux is likely to be very small or even zero.) The iterative allocation may continue until all of the refresh probability increments have been allocated, and the resulting refresh probabilities of the items 14 may be used to deploy the cache refreshing resources 22. In this manner, the third technique may be utilized to achieve an approximate (but perhaps acceptable) computation of refresh probabilities while consuming fewer computing resources than more precise techniques. However, those of ordinary skill in the art may devise many models and algorithms for computing the refresh utilities of the items 14 of the item cache 12 while implementing the techniques discussed herein.

Figure 12:
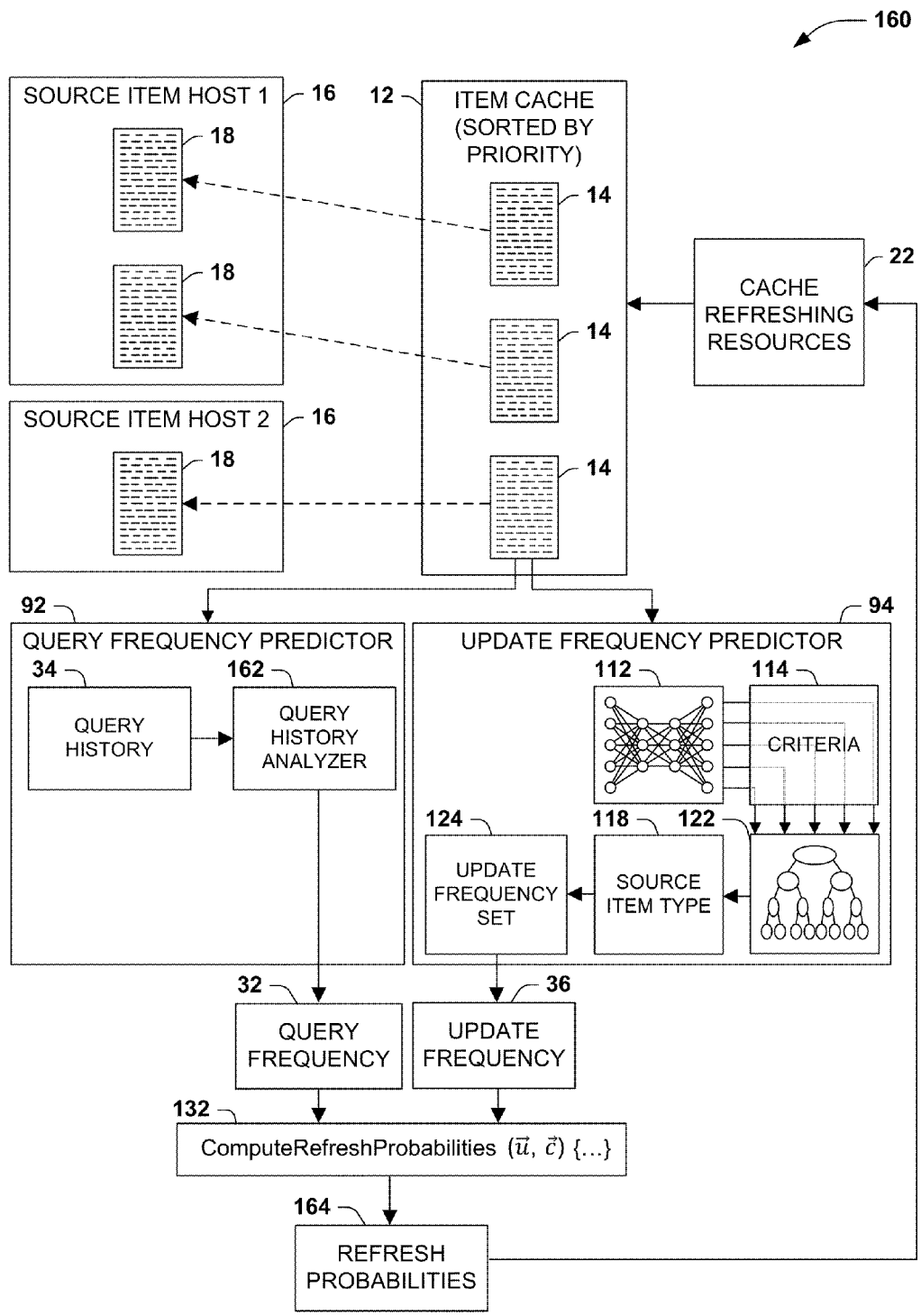
FIG. 12 an illustration of an allocation of a set of cache refreshing resources based on refresh probabilities computed for various items in an item cache according to predicted query frequencies and predicted update frequencies.

In view of the foregoing discussion of predicting the query frequencies 32, predicting the update frequencies 36, and computing the refresh utilities of the items 14 of the item cache 12, a more detailed appreciation of an exemplary embodiment of these techniques may be appreciated. FIG. 12 presents the components of one such embodiment utilized in an exemplary scenario 160 featuring a refreshing of items 14 in an item cache 12 that correspond to source items 18 stored by various source item hosts 16 that operates according to the techniques discussed herein. In order to allocate a set of cache refreshing resources 22 to preserve the freshness of the item cache 12, a set of refresh probabilities 164 may be computed for the respective items 14 of the item cache 12. For example, an item 14 may be evaluated by a query frequency predictor 92, which may comprise a query history analyzer 162 that compares the item 14 to a query history 34 (e.g., an item request log) to determine the rate at which the item 14 has recently been requested, and which may output a query frequency 32 predicted for the item 14. Also, the source item 18 corresponding to the item 14 may be evaluated by an update frequency predictor 94, which may first evaluate the contents of the source item 18 by a criterion identifier 112, such as a backpropagation neural network trained to identify criteria 14 of various source items 18. The criterion identifier 112 by output a set of criteria 114, which may be provided to a source item type identifier 122, such as a Bayesian classifier system, which may be trained to identify the source item type 118 of a source item 18 based on criteria 114 extracted therefrom. After the source item type identifier 122 identifies the source item type 118 of the source item 18, the source item type 118 may be compared against an update frequency set 124, which maps source item types 118 to typical update frequencies 36 thereof. The update frequency predictor 94 may therefore select and output the update frequency 36 predicted for the source item 14. The predicted query frequencies 32 and the predicted update frequencies 36 of the various items 14 in the item cache 12 may then be evaluated to predict the refresh utilities thereof, e.g., by applying the first pseudocode block 132 of FIG. 9 to produce a set of refresh probabilities 164. These refresh probabilities 164 may then be used by the cache refreshing resources 22 to prioritize the refreshing of the items 14 according to the relative refresh utilities thereof. While this exemplary scenario 160 features one implementation utilizing some of these concepts, those of ordinary skill in the art may devise many such implementations that embody the techniques discussed herein.

A fifth aspect that may vary among embodiments of these techniques relates to additional features that may be added to implementations to present additional advantages and/or reduce disadvantages. A first variation of this fifth aspect relates to additional factors that might be considered while computing the refresh utilities of various items 14, such as may be included in the computation of the respective refresh utilities or in the prioritization of the items 14. As a first example, it may be appreciated that different source items 18 may embody comparatively different penalties for staleness. A source item 18 that features time-sensitive information, such as breaking news or stock information, may incur a comparatively high penalty if an out-of-date item 14 is served from the item cache 12, while a source item 18 that features non-time-sensitive information, such as an academic article or an encyclopedic entry, might incur a comparatively low penalty. Thus, it might be advantageous to prioritize the refreshing of a time-sensitive item 14 over a non-time-sensitive item 14, even if the latter exhibits a higher query frequency 32 and update frequency 36 than the former. Therefore, the prioritization of refreshing items 14 may be based in part on an update value of respective items 14, representing the incremental value of providing an updated item 14 over an out-of-date item 14. For example, for respective source items 18, an update value may be predicted, and the computing of the refresh utility of an item 18 may be based in part on the update value. As one technique for achieving the predicting of the update value, an update frequency set 124, such as in FIG. 8, might be configured to output a predicted update value along with the predicted update frequency 36 for respective source item types 118. As a second example of this first variation, the prioritizing might be based (alternatively or additionally) on a refresh cost associated with refreshing a particular item 14. In some scenarios, refreshing a first item 14 may be more costly than refreshing a second item 14, such as where the first item 14 is much larger and consumes more time and/or bandwidth to refresh, or where a charge is assessed for refreshing the first item 14 (e.g., in a mobile agent scenario.) Per-item refresh costs may therefore be attributed to various items 14, and these refresh costs may be included in the computation of refresh utilities.

As a second variation of this fifth aspect, additional features may pertain to the use of the computed refresh utilities in the actual refreshing of the items 14. In one set of embodiments of these techniques, the prioritization of the items 14 may be computed and provided to other resources of the computer 82, such as a set of cache refreshing resources 22 that may be included in the item cache 12. However, in other embodiments, after the refresh utility is computed, a refresh frequency 40 may be computed for various items 14 based on the refresh utilities, and the items 14 may be refreshed according to the refresh frequencies 40. As in the exemplary scenario 50 of FIG. 3, if the computer 82 comprises a cache refreshing resource set comprising cache refreshing resources 22 that are configured to refresh items 14 in the item cache 12, these resources may be allocated based on respective refresh utilities of the items 14. The computation of the refresh utilities may also be used to demonstrate the value and efficiency of the refreshing of the item cache 12. For example, an aggregate refresh utility of the items 14 stored in the item cache 12 may be computed in view of a particular cache refreshing resource set (e.g., by using the dual summation computation provided above to measure the reduction in the cache penalty achieved by the cache refreshing resource set.) Moreover, these computations may be useful in configuring the cache refreshing resource set to achieve a refresh utility proportional to the computing resources consumed thereby. For example, the differential aggregate refresh utility achievable by a first cache refreshing resource set as compared with a second cache refreshing resource set. This computation may be useful, e.g., for evaluating improvements in the performance of the item cache 12 if more or fewer resources are allocated to the cache refreshing resource set.

As a third variation of this fifth aspect, the computed refresh utility may be computed in relation to perceptions of quality of the item cache 12. In several examples presented herein, such as the exemplary scenario 10 of FIG. 1, the utility of refreshing an item 14 in the item cache 12 is discussed with relation to the penalty of serving a stale item from the item cache 12. However, in some scenarios, the item cache 12 might not serve items 14 directly in response to queries, but may generate various types of query results based on the versions of the items 14 stored in the item cache 12, e.g., reports, charts, summaries, or mathematical aggregations of all or selected sets of items 14. The quality of these query results may vary based on the freshness of the items 14 stored in the item cache 12. Therefore, it may be more practical to measure the quality of the item cache 12 according to the quality of a query result applied to the item cache 12, and to apply embodiments of these techniques to promote the measured quality of the query result, instead of endeavoring to reduce the penalty of serving stale versions of items 14 from the item cache 12. For example, an embodiment of these techniques may be configured to compute a query quality metric of the item cache indicating a quality of at least one query result generated in response to a query applied to the item cache, and to prioritize the refreshing of the items based on the refresh utilities in order to improve the query quality metric of the item cache. The prioritizing may be adjusted, e.g., by a learning function that tests various sets of update frequencies 36 and identifies corresponding improvements (or lack of improvements) in the resulting query quality metrics. Moreover, if the quality of such query results of the item cache 12 is measurable, it may be advantageous to compare the differential improvement in this quality with the cost of more aggressive refreshing the item cache 12 (e.g., by a cache refreshing resource set 20), and to select an advantageous item cache refreshing strategy that achieves a desirably high measured quality with an economical allotment of cache refreshing resources 22.

One exemplary scenario wherein this variation might be utilized involves a caching of items relating to web pages that are index by a search engine. According to the techniques discussed herein, the search engine might be configured to update the items 14 in the item cache 12 representing the search index of the search engine in order to maintain the freshness of search results. The search engine may query the item cache 12 for items 14 matching a particular search query, but may also utilize the item cache 12 to rank such items 14, e.g., according to the predominance of particular keywords in the web page or the credibility of the web page. In this manner, the search engine may utilize the item cache 12 not only for per-item queries, but also for search queries that compute rankings of items 14 as well as generating particular search results relating thereto. Moreover, these search engine results and rankings may change over time as the indexed web pages and interrelations thereof change. For example, a particular website may be identified as a more or less reliable source of information about particular topics (e.g., if many other sources begin linking to and referencing the website as an authoritative source of information on some topics); thus, even if the contents of the website have not changed, a fresh item cache 12 might rank results identifying the website higher. However, a per-item refreshing strategy may result in an undesirably large amount of refreshing, particularly if the size of the item cache 12 is large. Moreover, such aggressive refreshing may not generate proportional utility in the form of improved search engine results; i.e., an overly aggressive per-item refreshing strategy may not yield discernibly improved search engine results. Instead, it may be possible to assess the quality of a search engine result generated by the search engine (with reference to the item cache 12), involving an evaluation of various aspects, such as the freshness of the per-item results and the currency of the rankings of such results. Moreover, it may be possible to adjust the refreshing strategy of the item cache 12 in view of the resulting quality of the search engine results generated therefrom.

Figure 13:
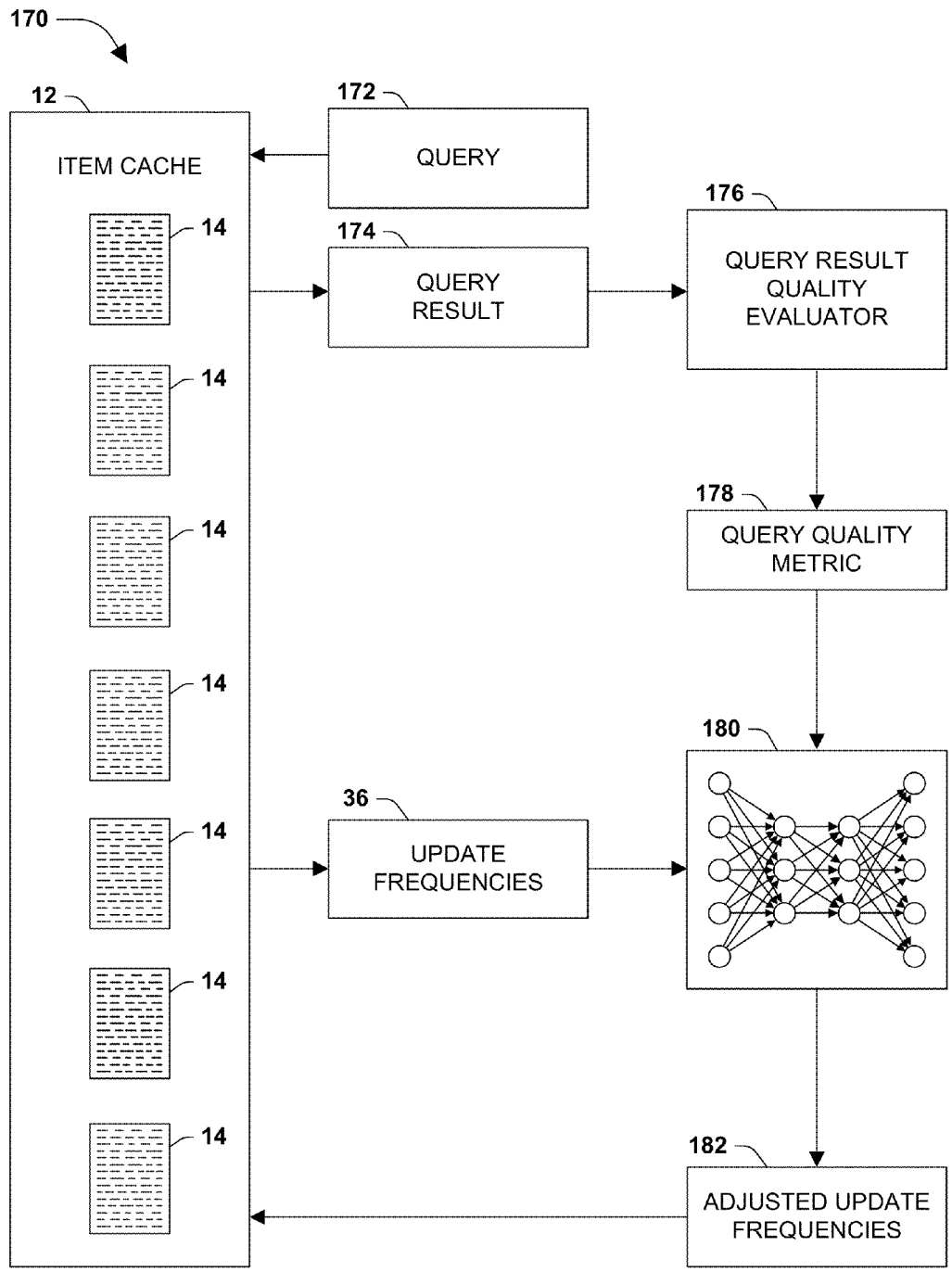
FIG. 13 is an illustration of an embodiment of these techniques adjusted in view of a query quality metric of query results generated by the item cache.

FIG. 13 illustrates an exemplary scenario 170 featuring an application of this variation, wherein an item cache 12 comprises various items 14 corresponding to source items 18 stored by various source item hosts 16. In this exemplary scenario 170, the quality of the item cache 12 is evaluated not by a prediction of the penalty of serving a stale item 14 from the item cache 12, but based on the quality of a query result 174 generated in response to a query 172. The query result 174 is evaluate by a query result quality evaluator 176, e.g., a function that is configured to test various aspects of the query result 174 for indications of quality relating generally to the freshness of the item cache 12. (For example, a search query might be applied to a search index of a search engine, and a quality evaluation may be generated from the search results of the search query, such as the accuracy of rankings of search results.) The query result quality evaluator 176 may output a query quality metric 178 that is indicative of the quality of the query result 174, based in part on the freshness of the items 14 In the item cache 12. Moreover, it may be possible to adjust the refreshing strategy of the item cache 12 in order to achieve desirably high query quality metrics 178 of the resulting query results 174. For example, a learning function 180, such as a backpropagation neural network, may accept the current update frequencies 36 of the item cache 12 and the resulting query quality metric 178 as input, and may output a set of adjusted update frequencies 182 that might achieve a better query quality metric 178 of resulting query results 174. The adjusted update frequencies 182 may be applied to the item cache 12. After a period of time, the freshness of the item cache 12 may be retested by applying another query 172 to the item cache 12 and evaluating the query result 174 with the query result quality evaluator 176. The resulting query quality metric 178 may then be provided as input to the learning function 180, thereby completing the learning circuit. After several iterations, the learning function 180 may be suitably trained to adjust the update frequencies 36 in order to achieve desirably high query quality metrics 178. However, those of ordinary skill in the art may devise many additional features that may be added to embodiments of the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 14:
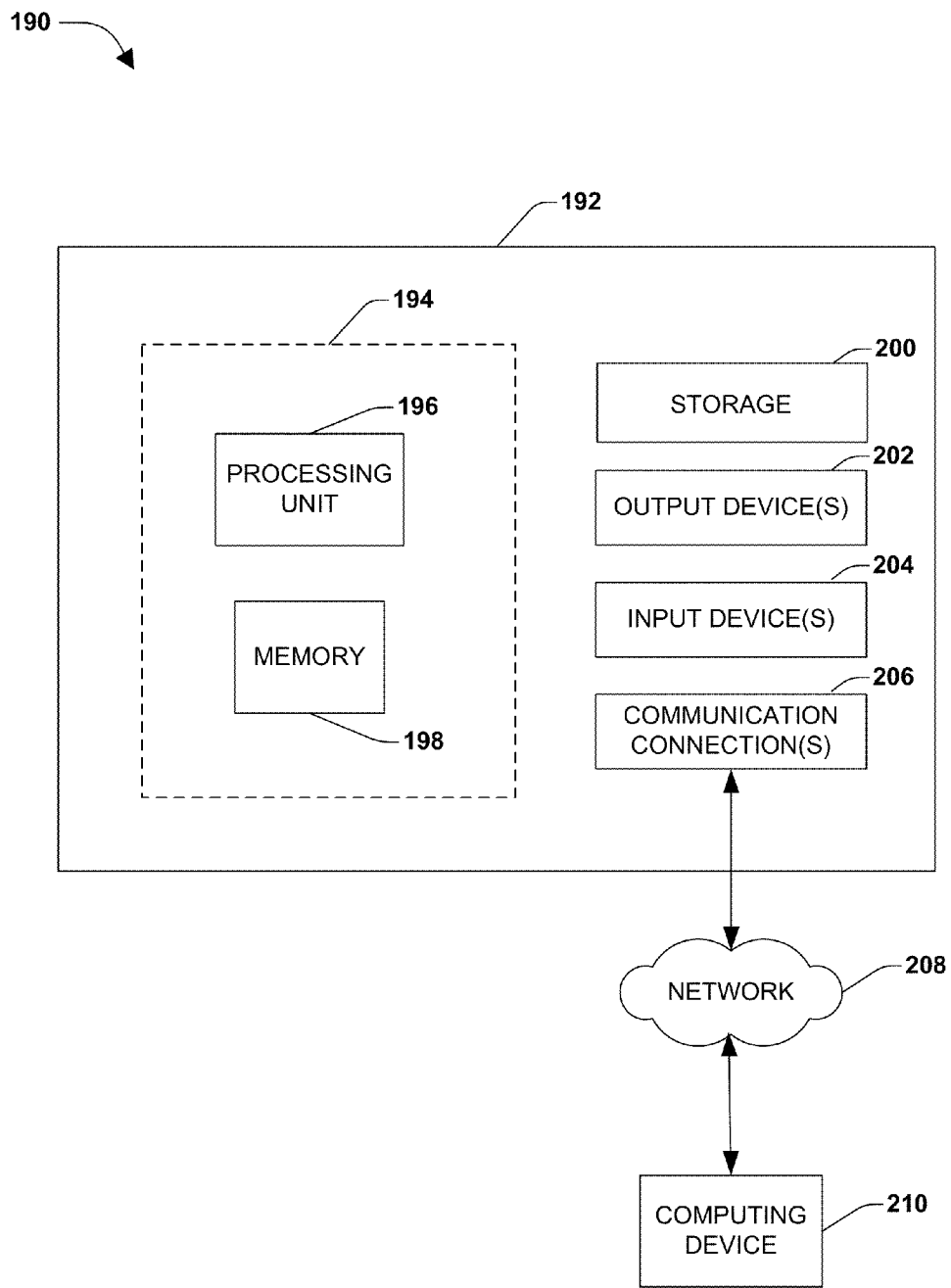
FIG. 14 illustrates an exemplary computing environment wherein one or more of the provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 190 comprising a computing device 192 configured to implement one or more embodiments provided herein. In one configuration, computing device 192 includes at least one processing unit 196 and memory 198. Depending on the exact configuration and type of computing device, memory 198 may be volatile (such as RAM, for example), non-volatile (such as ROM, flash memory, etc., for example) or some combination of the two. This configuration is illustrated in FIG. 14 by dashed line 194.

In other embodiments, device 192 may include additional features and/or functionality. For example, device 192 may also include additional storage (e.g., removable and/or non-removable) including, but not limited to, magnetic storage, optical storage, and the like. Such additional storage is illustrated in FIG. 14 by storage 200. In one embodiment, computer readable instructions to implement one or more embodiments provided herein may be in storage 200. Storage 200 may also store other computer readable instructions to implement an operating system, an application program, and the like. Computer readable instructions may be loaded in memory 198 for execution by processing unit 196, for example.

The term "computer readable media" as used herein includes computer storage media. Computer storage media includes volatile and nonvolatile, removable and non-removable media implemented in any method or technology for storage of information such as computer readable instructions or other data. Memory 198 and storage 200 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 192. Any such computer storage media may be part of device 192.

Device 192 may also include communication connection(s) 206 that allows device 192 to communicate with other devices. Communication connection(s) 206 may include, but is not limited to, a modem, a Network Interface Card (NIC), an integrated network interface, a radio frequency transmitter/receiver, an infrared port, a USB connection, or other interfaces for connecting computing device 192 to other computing devices. Communication connection(s) 206 may include a wired connection or a wireless connection. Communication connection(s) 206 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 192 may include input device(s) 204 such as keyboard, mouse, pen, voice input device, touch input device, infrared cameras, video input devices, and/or any other input device. Output device(s) 202 such as one or more displays, speakers, printers, and/or any other output device may also be included in device 192. Input device(s) 204 and output device(s) 202 may be connected to device 192 via a wired connection, wireless connection, or any combination thereof. In one embodiment, an input device or an output device from another computing device may be used as input device(s) 204 or output device(s) 202 for computing device 192.

Components of computing device 192 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 192 may be interconnected by a network. For example, memory 198 may be comprised of multiple physical memory units located in different physical locations interconnected by a network.

Those skilled in the art will realize that storage devices utilized to store computer readable instructions may be distributed across a network. For example, a computing device 210 accessible via network 208 may store computer readable instructions to implement one or more embodiments provided herein. Computing device 192 may access computing device 210 and download a part or all of the computer readable instructions for execution. Alternatively, computing device 192 may download pieces of the computer readable instructions, as needed, or some instructions may be executed at computing device 192 and some at computing device 210.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of prioritizing a refreshing of items provided in response to queries, the items stored in an item cache by a computer having a processor, respective items corresponding to a source item retrieved from a source item host accessible to the computer, and the method comprising:
    executing on the processor instructions configured to:
        for respective items:
            predict a query frequency of queries requesting the item,
            predict an update frequency of the source item by the source item host, and
            compute a refresh utility of the item based on the query frequency and the update frequency; and
        prioritize refreshing a first item of the item cache having a first computed refresh utility over refreshing a second item of the item cache having a lower computed refresh utility than the first computed refresh utility of the first item.

2. The method of claim 1:
    the source items comprising web-accessible source items;
    the source item hosts comprising webservers hosting the web-accessible source items; and
    the item cache comprising a proxy cache configured to:
        cache web-accessible source items that are frequently requested by the users, and
        provide an item corresponding to a web-accessible source item requested by a user.

3. The method of claim 1:
    the source items comprising web-accessible source items;
    the source item hosts comprising webservers hosting the web-accessible source items; and
    the item cache comprising a web search cache configured to identify web-accessible source items corresponding to web queries received from web users.

4. The method of claim 1, predicting the query frequency comprising:
    for respective items:
        tracking a rate of queries for the item, and
        computing a query frequency for the item based on the rate of queries;
    generating an item query frequency set configured to map items to query frequencies; and
    predicting the query frequency of an item comprising:
        selecting the query frequency of the item from the item query frequency set.

5. The method of claim 1, predicting the query frequency of the item comprising:
    training a probabilistic classifier to predict query frequencies of items based on a training item set comprising items associated with known query frequencies, and
    applying the probabilistic classifier to an item to predict the query frequency of the item.

6. The method of claim 1, predicting the update frequency of a source item by the source item host comprising:
    extracting at least one source item criterion of the source item;
    classifying the source item as a source item type according to the at least one source item criterion; and
    predicting the update frequency of the source item based on the update frequencies of other source items of the source item type.

7. The method of claim 6, generating the update frequency set comprising:
    generating a machine learning function configured to map source item types to update frequencies, and training the machine learning function based on a training data set associating source items of respective source item types with update frequencies.

8. The method of claim 1, computing the refresh utility comprising:

for respective items:
computing a refresh probability for the item based on the query frequency of queries requesting the item and the update probability of the source item by the source item host, the refresh probabilities selected to yield a desirably high refresh utility; and
after at least one item in the item cache is refreshed, recomputing the refresh probability for the item based on the query frequency of queries requesting the item and the update probability of the source item by the source item host.

9. The method of claim 8, the refresh utility computed according to a refresh utility model comprising:

$$max \Sigma_{t=1}^{T}(\Sigma hd\ i=1^n x_t^i \cdot u_i)$$

such that:

$$\Sigma p_i \leq 1$$

$$p_i \geq 0$$

$$0 \leq x_t^i \leq 1$$

$$x_0^i = 0$$

$$x_{t+1}^i = x_t^i \cdot (1-c_i) \cdot (1-p_i) + p_i$$

wherein:
n represents the number of items in the item cache;
t represents a time point;
$u_i$ represents a query frequency of item i;
$x_t^i$ represents a probability that source item i has been updated by the source item host at time t since the item was last refreshed;
$c_i$ represents a freshness probability comprising a probability that the source item i has not been updated by the source item host of source item i since the item i was last refreshed; and
$p_i$ represents a refresh probability of item i at time t.

10. The method of claim 9, computing the refresh probabilities for respective items comprising:
selecting an item subset comprising at least one item from the item cache;
computing a Lagrange multiplier over respective items of the subset based on the query frequency of queries requesting the item and the update probability of the source item by the source item host; and
for respective items, computing a refresh probability based on the update frequency of the source item by the source item host, the query frequency of queries requesting the item, and the Lagrange multiplier.

11. The method of claim 9, computing the refresh probabilities for respective items comprising:
forming an item subset comprising the items of the item cache;
while at least one item in the item subset may comprise a refresh probability less than zero:
removing items from the subset having a refresh probability less than zero;
computing a Lagrange multiplier over respective items of the subset based on the query frequency of queries requesting the item and the update probability of the source item by the source item host; and
for respective items in the item subset, computing a refresh probability.

12. The method of claim 11:
the method comprising: computing an output of an objective function according to the mathematical formula:

$$F(p_1, \ldots p_n) = \sum_i \frac{u_i p_i}{p_i + c_i - p_i c_i}$$

wherein:
$u_i$ represents a query frequency of item i
$c_i$ represents a freshness probability comprising a probability that the source item i has not been updated by the source item host of source item i since the item i was last refreshed, and
$p_i$ represents a refresh probability of item i;
the Lagrange multiplier computed according to the mathematical formula:

$$\lambda = \left( \frac{\sum_i \frac{\sqrt{u_i c_i}}{(1-c_i)}}{1 + \sum_i \frac{c_i}{1-c_i}} \right)^2 ; \text{ and}$$

the refresh probabilities for respective items in the item subset computed according to the mathematical formula:

$$p_i = \frac{\sqrt{\frac{u_i c_i}{\lambda}} - c_i}{1 - c_i}.$$

13. The method of claim 9, computing the refresh probabilities for respective items comprising: iteratively allocating a refresh probability increment to the refresh probability of the item having a maximum derivative flux based on the query frequency, the update frequency, and the refresh probability allocated to the item.

14. The method of claim 1, the instructions configured to, for respective items:
select a refresh frequency based on the refresh utility, and
refresh the item stored in the item cache according to the refresh frequency of the item.

15. The method of claim 14:
the computer comprising a cache refreshing resource set comprising at least one cache refreshing resource configured to refresh items in the item cache, and
the prioritizing comprising: allocating the cache refreshing resources of the cache refreshing resource set to refresh items in the item cache based on respective refresh utilities of the items.

16. The method of claim 15, the instructions configured to compute an aggregate refresh utility of the items stored in the item cache that is achievable by the cache refreshing resource set.

17. The method of claim 16, the instructions configured to:
compute a first aggregate refresh utility of the items stored in the item cache that is achievable by a first cache refreshing resource set;

compute a second aggregate refresh utility of the items stored in the item cache that is achievable by a second cache refreshing resource set; and compute a differential aggregate refresh utility of the items stored in the item cache that is differentially achievable by the first cache refreshing resource set as compared with the second cache refreshing resource set.

18. The method of claim 1, the instructions configured to:

compute a query quality metric of the item cache indicating a quality of at least one query result generated in response to a query applied to the item cache, and prioritize the refreshing of the items based on the refresh utilities in order to improve the query quality metric of the item cache.

19. A system configured to prioritize a refreshing of items provided in response to queries, the items stored in an item cache by a computer having a processor, respective items corresponding to a source item retrieved from a source item host accessible to the computer, and the system comprising:

a refresh utility computing component configured to compute a refresh utility of the items stored in the item cache by, for respective items:

predicting a query frequency of queries requesting the item, predicting an update frequency of the source item by the source item host, and computing a refresh utility of the item based on the query frequency and the update frequency; and an item prioritizing component configured to prioritize the refreshing a first item of the item cache having a first computed refresh utility over refreshing a second item of the item cache having a lower computed refresh utility than the first computed refresh utility of the first item.

20. A memory device storing instructions that, when executed on a processor of a computing device having an item cache that caches at least two items, cause the computing device to prioritize refreshing the at least two items of the item cache, by:

for respective items:

predicting a query frequency of queries requesting the item, predicting an update frequency of the source item by the source item host, and computing a refresh utility of the item based on the query frequency and the update frequency; and prioritizing refreshing a first item of the item cache having a first computed refresh utility over refreshing a second item of the item cache having a lower computed refresh utility than the first computed refresh utility of the first item.

* * * * *